(12) United States Patent
Yonger et al.

(10) Patent No.: US 11,685,849 B2
(45) Date of Patent: Jun. 27, 2023

(54) ABRASIVE PARTICLE INCLUDING COATING, ABRASIVE ARTICLE INCLUDING THE ABRASIVE PARTICLES, AND METHOD OF FORMING

(71) Applicants: SAINT-GOBAIN ABRASIVES, INC., Worcester, MA (US); SAINT-GOBAIN ABRASIFS, Conflans-Sainte-Honorine (FR)

(72) Inventors: Marc Yonger, Paris (FR); Leslie Dos Santos, Paris (FR); Anne M. Bonner, Hudson, MA (US); Mark W. Simon, Sutton, MA (US); Subramanian Ramalingam, Shrewsbury, MA (US); Anthony Martone, Cambridge, MA (US); Hua Fan, Southborough, MA (US); Darrell K. Everts, Schenectady, NY (US); Brahmanandam V. Tanikella, Northborough, MA (US); Aldric Barbier, Longnes (FR)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 17/754,686

(22) PCT Filed: Oct. 9, 2020

(86) PCT No.: PCT/US2020/055110
§ 371 (c)(1),
(2) Date: Apr. 8, 2022

(87) PCT Pub. No.: WO2021/072293
PCT Pub. Date: Apr. 15, 2021

(65) Prior Publication Data
US 2022/0372354 A1 Nov. 24, 2022

Related U.S. Application Data

(60) Provisional application No. 62/914,369, filed on Oct. 11, 2019, provisional application No. 62/914,360, filed on Oct. 11, 2019.

(51) Int. Cl.
*C09K 3/14* (2006.01)

(52) U.S. Cl.
CPC .......... *C09K 3/1409* (2013.01); *C09K 3/1436* (2013.01)

(58) Field of Classification Search
None
See application file for complete search history.

(56) References Cited

U.S. PATENT DOCUMENTS

| | | |
|---|---|---|
| 2,527,044 A | 10/1950 | Walton et al. |
| 3,525,600 A | 8/1970 | Yoshikawa et al. |
| (Continued) | | |

FOREIGN PATENT DOCUMENTS

| | | |
|---|---|---|
| BR | PI9004483 A | 9/1991 |
| CN | 1188465 A | 7/1998 |
| (Continued) | | |

OTHER PUBLICATIONS

International Search report and Written Opinion for PCT/US2020/055110, dated Jan. 29, 2021, 11 pages.
(Continued)

*Primary Examiner* — Pegah Parvini
*Assistant Examiner* — Ross J Christie
(74) *Attorney, Agent, or Firm* — Abel Schillinger, LLP; Arpan Ghosh

(57) ABSTRACT

An abrasive particle can include a coating overlying at least a portion of a core. In an embodiment, the coating can
(Continued)

include a first portion overlying at least a portion of the core and a second portion overlying at least a portion of the core, wherein the first portion can include a ceramic material and the second portion can include a silane or a silane reaction product. In a particular embodiment, the first portion can consist essentially of silica. In another particular embodiment, the first portion can include a surface roughness of not greater than 5 nm and a crystalline content of not greater than 60%.

20 Claims, 10 Drawing Sheets

(56) References Cited

U.S. PATENT DOCUMENTS

| | | | |
|---|---|---|---|
| 5,042,991 A | | 8/1991 | Kunz et al. |
| 5,213,591 A | | 5/1993 | Celikkaya et al. |
| 6,048,577 A | | 4/2000 | Garg |
| 6,258,137 B1 | | 7/2001 | Garg et al. |
| 7,959,695 B2 * | | 6/2011 | Yener ............... C09K 3/1436 427/255.18 |
| 8,834,618 B2 | | 9/2014 | Baran, Jr. et al. |
| 8,894,466 B2 | | 11/2014 | Jungbauer et al. |
| 9,120,960 B2 | | 9/2015 | Bakshi et al. |
| 9,193,631 B2 | | 11/2015 | Marlin et al. |
| 9,382,450 B2 | | 7/2016 | Belmont et al. |
| 10,005,171 B2 | | 6/2018 | Culler et al. |
| 10,087,082 B2 * | | 10/2018 | Schlenoff ............. C09C 1/3045 |
| 10,493,595 B2 | | 12/2019 | Deleuze et al. |
| 2003/0005646 A1 | | 1/2003 | McHale, Jr. |
| 2007/0077868 A1 | | 4/2007 | Ito et al. |
| 2009/0235591 A1 | | 9/2009 | Yener et al. |
| 2012/0167477 A1 | | 7/2012 | Wang et al. |
| 2015/0291865 A1 | | 10/2015 | Breder et al. |
| 2015/0291866 A1 | | 10/2015 | Arcona et al. |
| 2015/0291867 A1 | | 10/2015 | Breder et al. |
| 2015/0376458 A1 | | 12/2015 | Grumbine et al. |

FOREIGN PATENT DOCUMENTS

| | | |
|---|---|---|
| CN | 1295291 C | 1/2007 |
| CN | 101815771 A | 8/2010 |
| CN | 102719220 B | 10/2014 |
| CN | 108192566 A | 6/2018 |
| CN | 108883519 A | 11/2018 |
| EP | 0417729 B1 | 8/1997 |
| EP | 0833803 B1 | 8/2001 |
| GB | 526130 A | 9/1940 |
| JP | 2003321276 A | 11/2003 |
| JP | 2007203442 A | 8/2007 |
| JP | 2011238952 A | 11/2011 |
| KR | 1020000047799 A | 7/2000 |
| KR | 100560012 B1 | 3/2006 |
| RU | 2055853 C1 | 3/1996 |
| WO | 9700836 A1 | 1/1997 |
| WO | 2007088461 A1 | 8/2007 |
| WO | 2014209567 A1 | 12/2014 |
| WO | 2022077030 A1 | 4/2022 |

OTHER PUBLICATIONS

International Search Report and Written Opinion for PCT/US2021/071794, dated Feb. 10, 2022, 9 pages.

* cited by examiner

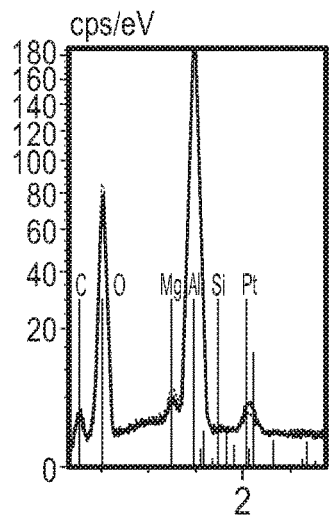 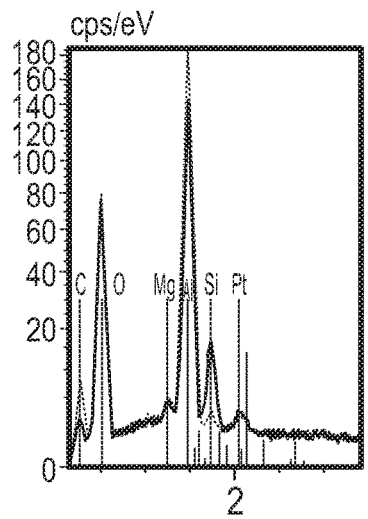 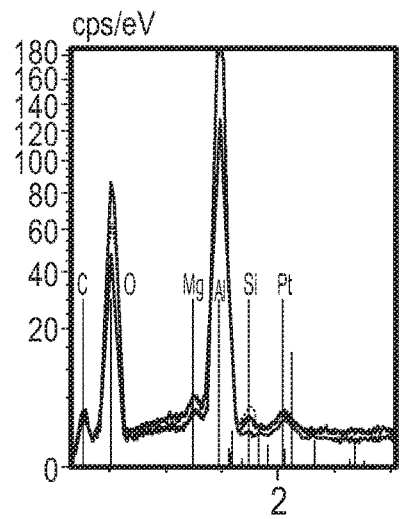
*FIG. 3A*     *FIG. 3B*     *FIG. 3C*
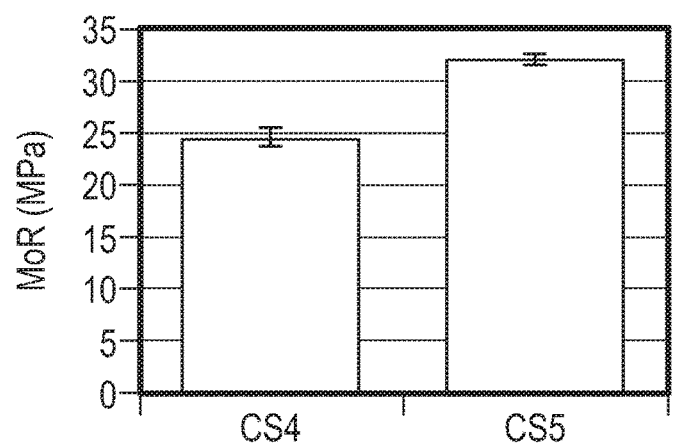
*FIG. 4*

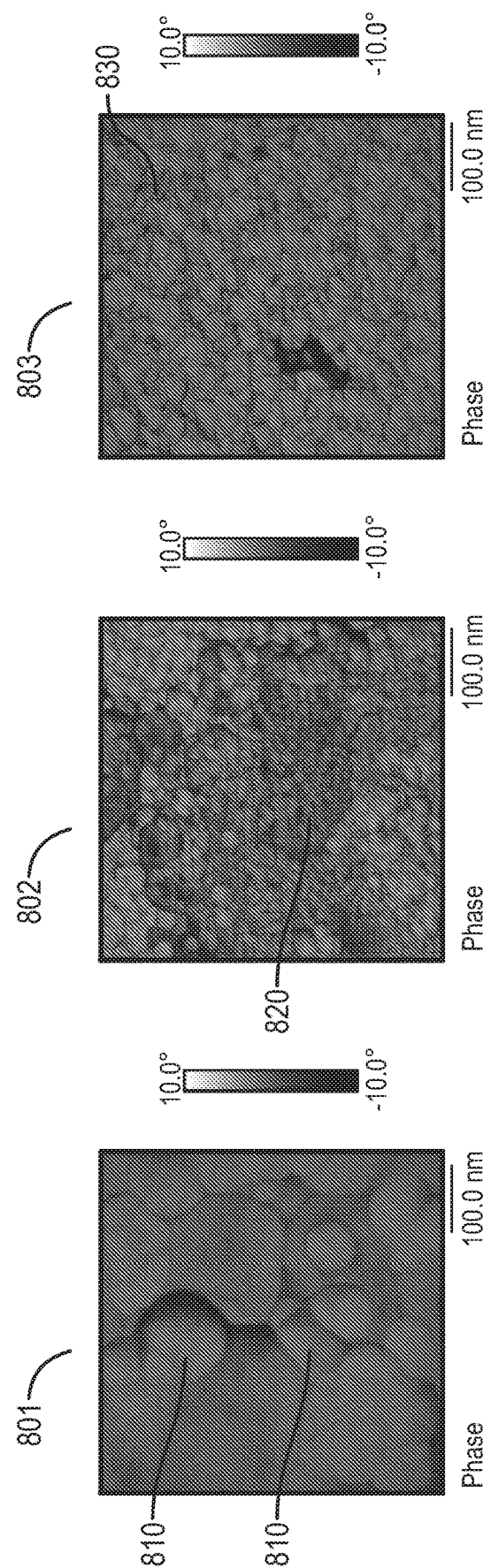

ABRASIVE PARTICLE INCLUDING COATING, ABRASIVE ARTICLE INCLUDING THE ABRASIVE PARTICLES, AND METHOD OF FORMING

CROSS-REFERENCE TO RELATED APPLICATIONS

This application is a National Stage entry under 35 U.S.C. § 371 of International Application No. PCT/US2020/055110, filed Oct. 9, 2020, entitled "ABRASIVE PARTICLE INCLUDING COATING, ABRASIVE ARTICLE INCLUDING THE ABRASIVE PARTICLES, AND METHOD OF FORMING," by Marc YONGER et al., which claims priority to U.S. Provisional Patent Application No. 62/914,369, filed Oct. 11, 2019, entitled "ABRASIVE ARTICLE AND METHOD OF FORMING," by Marc YONGER et al., and to U.S. Provisional Patent Application No. 62/914,360, filed Oct. 11, 2019, entitled "ABRASIVE PARTICLE INCLUDING COATING AND METHOD OF FORMING," by Marc YONGER et al., all of which applications are assigned to the current assignees hereof and incorporated herein by reference in their entireties.

TECHNICAL FIELD

The following is directed to abrasive particles including a coating overlying at least a portion of a core, abrasive article including the abrasive particles, and methods of forming.

BACKGROUND ART

Abrasive articles are used in material removal operations, such as cutting, grinding, or shaping various materials. Fixed abrasive articles include abrasive particles held in a bond material. The bond material can include an organic and/or inorganic material. Organic bond abrasive articles often perform poorly under wet grinding conditions. Specifically, in a wet grinding operation, abrasive particles can become dislodged from the abrasive article before their consumption. The industry continues to demand improved abrasive articles.

BRIEF DESCRIPTION OF THE DRAWINGS

The present disclosure may be better understood, and its numerous features and advantages made apparent to those skilled in the art by referencing the accompanying drawings.

FIGS. 3A to 3C include graphs of Energy Dispersive Spectroscopy readouts of abrasive particle samples.

FIG. 4 includes a plot illustrating Modulus of Rupture (MoR) of abrasive samples.

FIGS. 8A to 8C include atomic force microscopic images of abrasive particle samples.

Figure 1:
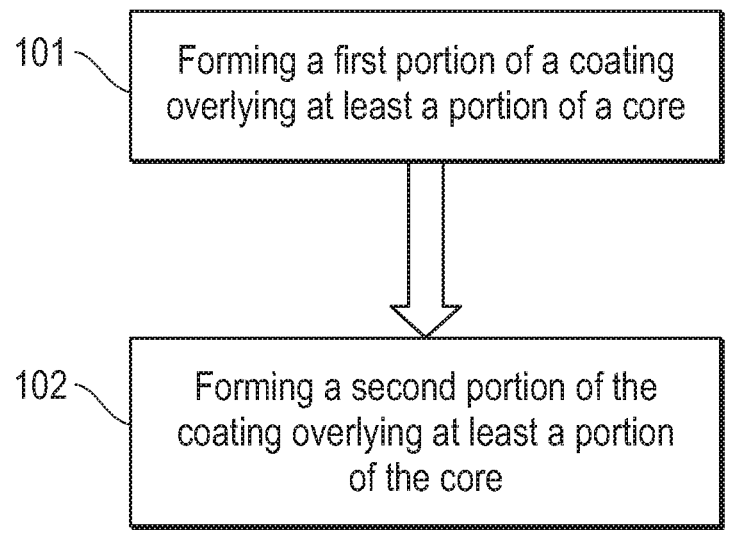
FIG. 1 includes a flowchart illustrating a forming process of a coated abrasive article according to an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE PREFERRED EMBODIMENT(S)

The following description in combination with the figures is provided to assist in understanding the teachings provided herein. The following disclosure will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments are directed to abrasive particles including a coating overlying a core.

The abrasive particles can be suitable for forming various abrasive articles including, for example, fixed abrasive articles, such as bonded abrasives, coated abrasives, and superabrasive articles. The abrasive particles can have improved bonding to the bond material contained in an abrasive article and facilitate improved performance of the abrasive article.

Embodiments further relate to process of forming the abrasive particles. The process can include a heat treatment to facilitate formation of a coating that has improved properties. For example, the process can allow formation of a coating having improved contents of silicon. In another instance, the coating can facilitate formation of an interface that has improved moisture resistance between the abrasive particles and the bond material in an abrasive article.

Further embodiments are directed to abrasive articles including a bond material and the abrasive particles. The abrasive articles can have improved bonding between the bond material and abrasive particles, which in turn can help improve performance and/or properties of abrasive articles. For example, abrasive articles of embodiments herein can have improved grinding performance under wet conditions, improved performance after aging, and extended service life.

The abrasive articles can include a fixed abrasive article including, for example, coated abrasives, such as a belt and a disc, bonded abrasives including organic bond materials and/or inorganic bond materials, and superabrasive tools. Exemplary bonded abrasive articles can include, for instance, grinding wheels, cutoff wheels, ultra-thin wheels, combination wheels, cutting wheels, chop saws, or any combination thereof.

FIG. 1 includes a flowchart illustrating a process of forming an abrasive particle including a coating. At block 101, the process can include forming a first portion of a coating overlying at least a portion of a core. Formation of the first portion can include treating the core with a first material including silica. For example, the first material can include a dispersion of silica in a solvent, and cores can be mixed with the dispersion. The solvent can be aqueous or an organic solvent. In another instance, the first material can include a powder including silica and a blend of powder and cores can be formed. Mixing equipment may be used to facilitate formation of uniform mixture of cores and the first material. Examples of mixing equipment can include Hobart mixers, Hudson mixers, or the like, or another mixing device.

In a particular embodiment, the first material can include colloidal silica. In an aspect, the first material can include a colloidal silica suspension. Cores can be wetted with the colloidal silica suspension. In another aspect, colloidal silica can be mixed with the cores such that the mixture can include a particular content of silica for a total weight of the cores that can facilitate improved formation and properties of the coating. For example, the mixture can include at least 0.01 wt. % of silica for a total weight of the cores, such as at least 0.02 wt. %, at least 0.03 wt. %, at least 0.04 wt. %, at least 0.05 wt. %, at least 0.06 wt. %, at least 0.07 wt. %, at least 0.08 wt. %, at least 0.09 wt. %, at least 0.1 wt. %, at least 0.15 wt. %, at least 0.16 wt. %, at least 0.17 wt. %, at least 0.18 wt. %, at least 0.19 wt. %, at least 0.2 wt. %, at least 0.25 wt. %, at least 0.26 wt. %, at least 0.27 wt. %, at least 0.28 wt. %, at least 0.29 wt. %, or at least 0.3 wt. % for a total weight of the cores. In another instance, the mixture may include not greater than 1 wt. % of silica for a total weight of the cores, such as not greater than 0.9 wt. %, not greater than 0.8 wt. %, not greater than 0.7 wt. %, not greater than 0.6 wt. %, not greater than 0.55 wt. %, not greater than 0.5 wt. %, not greater than 0.48 wt. %, not greater than 0.46 wt. %, not greater than 0.45 wt. %, not greater than 0.43 wt. %, not greater than 0.42 wt. %, not greater than 0.41 wt. %, not greater than 0.4 wt. %, not greater than 0.38 wt. %, not greater than 0.37 wt. %, not greater than 0.36 wt. %, not greater than 0.35 wt. %, or not greater than 0.34 wt. % for a total weight of the cores. Moreover, the mixture can include silica in a content including any of the minimum and maximum percentages noted herein.

In an embodiment, core can include an abrasive material including a crystalline material, such as a polycrystalline material, a monocrystalline material, or a combination thereof, an amorphous material, a ceramic material, a glass-ceramic material, superabrasives, minerals, a carbon-based material, or any combination thereof. In a further aspect, the sintered ceramic material can include oxides, carbides, nitrides, borides, oxycarbides, oxynitrides, silicates, or any combination thereof. For instance, core can include a material selected from the group of silicon dioxide, silicon carbide, alumina, zirconia, flint, garnet, emery, rare earth oxides, rare earth-containing materials, cerium oxide, sol-gel derived particles, gypsum, iron oxide, glass-containing particles, and a combination thereof. In another instance, abrasive particles may also include silicon carbide (e.g., Green 39C and Black 37C), brown fused alumina (57A), seeded gel abrasive, sintered alumina with additives, shaped and sintered aluminum oxide, pink alumina, ruby alumina (e.g., 25A and 86A), electrofused monocrystalline alumina 32A, MA88, alumina zirconia abrasives (e.g., NZ, NV, ZF Brand from Saint-Gobain Corporation), extruded bauxite, sintered bauxite, cubic boron nitride, diamond, aluminum oxy-nitride, sintered alumina (e.g., Treibacher's CCCSK), extruded alumina (e.g., SR1, TG, and TGII available from Saint-Gobain Corporation), or any combination thereof. In another example, core can have a Mohs hardness or at least 7, such as at least 8, or even at least 9.

In another embodiment, the core can include non-agglomerated particle, agglomerate, aggregate, non-shaped abrasive particles, shaped abrasive particle, or any combination thereof. For example, the core can include shaped abrasive particles as disclosed for example, in US 20150291865, US 20150291866, and US 20150291867. Shaped abrasive particles are formed such that each particle has substantially the same arrangement of surfaces and edges relative to each other for shaped abrasive particles having the same two-dimensional and three-dimensional shapes. As such, shaped abrasive particles can have a high shape fidelity and consistency in the arrangement of the surfaces and edges relative to other shaped abrasive particles of the group having the same two-dimensional and three-dimensional shape. By contrast, non-shaped abrasive particles can be formed through different process and have different shape attributes. For example, non-shaped abrasive particles are typically formed by a comminution process, wherein a mass of material is formed and then crushed and sieved to obtain abrasive particles of a certain size. However, a non-shaped abrasive particle will have a generally random arrangement of the surfaces and edges, and generally will lack any recognizable two-dimensional or three dimensional shape in the arrangement of the surfaces and edges around the body. Moreover, non-shaped abrasive particles of the same group or batch generally lack a consistent shape with respect to each other, such that the surfaces and edges are randomly arranged when compared to each other. Therefore, non-shaped grains or crushed grains have a significantly lower shape fidelity compared to shaped abrasive particles.

In a particular embodiment, the core can include a sintered ceramic material having a particular average crystallite size. In an aspect, the average crystallite size can be less than 1 micron, such as not greater than 0.9 microns, not greater than 0.8 microns, not greater than 0.7 microns, not greater than 0.6 microns, not greater than 0.5 microns, not greater than 0.4 microns, not greater than 0.3 microns, not greater than 0.2 microns, not greater than 0.1 microns, not greater than 0.09 microns, not greater than 0.08 microns, not greater than 0.07 microns, not greater than 0.06 microns, not greater than 0.05 microns, not greater than 0.04 microns, not greater than 0.03 microns, not greater than 0.02 microns, or not greater than 0.01microns. In another aspect, the core 201 can include a sintered ceramic material having an average crystallite size of at least 0.01 microns, such as at least 0.02 microns, at least 0.03 microns, at least 0.04 microns, at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16, at least 0.17 microns, at least 0.18 microns, at least 0.19 microns, at least 0.2 microns, at least 0.3 microns, or at least 0.4 microns, or at least 0.5 microns. Moreover, the core can include a sintered ceramic material including an average crystallite size in a range including any of the minimum and maximum values noted herein. For instance, the core can include a sintered ceramic material having an average crystallite size in a range including at least 0.01 microns and less than 1 micron, in a range including at least 0.03 microns and not greater than 0.8 microns, in a range including at least 0.05 microns and not greater than 0.6 microns, in a range including at least 0.08 microns and not greater than 0.4 microns, or in a range including at least 0.1 microns and not greater than 0.2 microns. The average crystallite size can be measured by an uncorrected intercept method by SEM micrographs.

A particular example of sintered ceramic material can include alumina ($Al_2O_3$), including, for example, microcrystalline alumina (e.g., sol-gel alumina), nanocrystalline alumina, fused alumina, or a combination thereof. Particularly, alumina ($Al_2O_3$) can include alpha alumina ($\alpha$-$Al_2O_3$).

In a particular aspect, the core can include a polycrystalline alpha alumina ($\alpha$-$Al_2O_3$), and more particularly, the polycrystalline alpha alumina ($\alpha$-$Al_2O_3$) can include an average crystallite size less than 1 micron, such as the average crystallite size as described with respect to the sintered ceramic material. In an even more particular aspect, the core can consist essentially of polycrystalline alpha alumina ($\alpha$-$Al_2O_3$) including an average crystallite size of less than 1 micron.

In an embodiment, the core can include a density of at least 80% of its theoretical density, such as at least 85%, at least 88%, at least 90%, at least 92%, at least 95%, or at least 98% of its theoretical density. In another embodiment, the core may include a porosity not greater than 10 vol % for a total volume of the core, not greater than 9 vol %, not greater than 8 vol %, not greater than 7 vol %, not greater than 6 vol %, not greater than 5 vol %, not greater than 4 vol %, not greater than 3 vol %, not greater than 2 vol %, or not greater than 1 vol % for the total volume of the core. In a particular embodiment, the core can be essentially free of pores.

In a further embodiment, the core can have the density of the sintered ceramic material that forms the core. For example, depending on the sintered ceramic material, the core can include a density of at least 2.10 $g/cm^3$, at least 2.20 $g/cm^3$, 2.30 $g/cm^3$, at least 2.40 $g/cm^3$, at least 2.50 $g/cm^3$, at least 2.60 $g/cm^3$, at least 2.70 $g/cm^3$, 2.80 $g/cm^3$, at least 2.90 $g/cm^3$, at least 3.00 $g/cm^3$, at least 3.10 $g/cm^3$, at least 3.20 $g/cm^3$, at least 3.30 $g/cm^3$, at least 3.40 $g/cm^3$, 3.50 $g/cm^3$, at least 3.55 $g/cm^3$, at least 3.60 $g/cm^3$, at least 3.65 $g/cm^3$, at least 3.70 $g/cm^3$, at least 3.75 $g/cm^3$, at least 3.80 $g/cm^3$, at least 3.85 $g/cm^3$, at least 3.90 $g/cm^3$, or at least 3.95 $g/cm^3$. Additionally or alternatively, the core can include a density of not greater than 5.80 $g/cm^3$, not greater than 5.70 $g/cm^3$, not greater than 5.60 $g/cm^3$, not greater than 5.50 $g/cm^3$, not greater than 5.40 $g/cm^3$, not greater than 5.30 $g/cm^3$, not greater than 5.20 $g/cm^3$, not greater than 5.10 $g/cm^3$, not greater than 5.00 $g/cm^3$, not greater than 4.90 $g/cm^3$, not greater than 4.80 $g/cm^3$, not greater than 4.70 $g/cm^3$, not greater than 4.60 $g/cm^3$, not greater than 4.50 $g/cm^3$, not greater than 4.40 $g/cm^3$, not greater than 4.30 $g/cm^3$, not greater than 4.20 $g/cm^3$, not greater than 4.10 $g/cm^3$, not greater than 4.00 $g/cm^3$, or not greater than 3.97 $g/cm^3$. In a further example, the core can have a density in a range including any of the minimum and maximum values noted herein.

Turning to FIG. 1, in an aspect, forming the first portion of the coating can further include heating the mixture including the cores treated with silica. Particularly, heating can be conducted at a temperature sufficient to form the first portion including a sintered ceramic material overlying at least a portion of the core. In an aspect, heating can include sintering silica. In a particular aspect, heating can include sintering colloidal silica. For instance, heating can be performed at a sintering temperature of colloidal silica. In another example, heating can be conducted at a temperature of at least 800° C., such as at least 830° C., or at least 850° C. In still another instance, the heating temperature may be not greater than 1100° C., such as not greater than 1000° C., not greater than 950° C., not greater than 900° C., or not greater than 850° C. Moreover, the heating temperature can be in a range including any of the minimum and maximum temperatures noted herein. In a particular instance, the heating temperature can be in a range from 830° C. to 1200° C., or in a range from 850° C. to 1100° C., or in a range from 850° C. to 950° C., or in a range from 850° C. to 900° C. In another aspect, heating can be performed for a certain period of time sufficient for forming sintered silica. For instance, heating can include sintering silica, such as colloidal silica, for at least 5 minutes, such as at least 10 minutes, at least 13 minutes, or at least 15 minutes. In another instance, sintering silica may be performed for not greater than 60 minutes, such as not greater than 45 minutes, not greater than 30 minutes, not greater than 30minutes, or not greater than 15 minutes. Moreover, heating can include sintering silica for a time period in a range including any of the minimum and maximum values noted herein.

In a further aspect, forming the first portion of coating can include forming a sintered ceramic material including silica. In a particular aspect, forming the first portion of the coating can include forming sintered colloidal silica.

In a particular exemplary implementation of forming the first portion of the coating, polycrystalline alpha-alumina particles can be mixed with a colloidal silica suspension. Wetted particles can be heated to 830° C. to 1200° C., particularly 830° C. to 850° C., sintered for 10 to 30 minutes, and then cooled at ambient air. The formed abrasive particles include sintered colloidal silica overlying polycrystalline alpha-alumina particles.

Figures 2A, 2B:
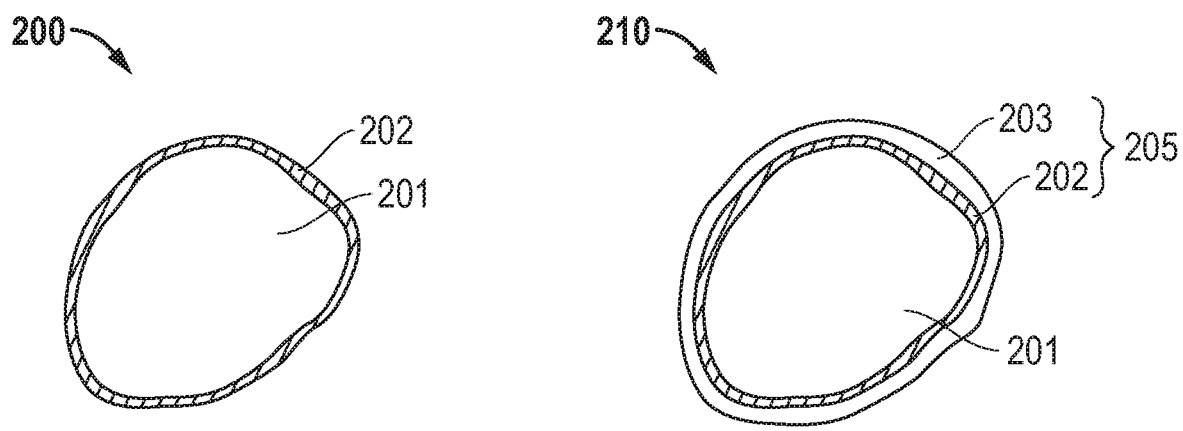
FIGS. 2A and 2B include illustrations of cross sections of abrasive particles according to embodiments.

FIG. 2A includes an illustration of a cross section of an abrasive particle 200 including a first portion 202 of a coating overlying a core 201. The first portion 202 of the coating can be in direct contact with the core 201. In an embodiment, the first portion 202 of the coating can be a layer overlying the entire surface of the core 201. In one embodiment, the first portion 202 of the coating may be overlying a majority of the surface of the core 201, and a portion of the core surface may not be covered by the first portion 202 of the coating. In another embodiment, the first portion 202 of the coating can have a substantially uniform thickness. In one embodiment, thickness of the first portion 202 of the coating may change along the surface of the core 201. In another embodiment, abrasive particles 200 may include an average thickness of the first portion 202 of the coating that can facilitate improved formation and properties of the abrasive particles. For instance, the average thickness of the first portion 202 can be at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16 microns, at least 0.17 microns, at least 0.18 microns, at least 0.19 microns, at least 0.20 microns, at least 0.21 microns, at least 0.22 microns, at least 0.23 microns, or at least 0.25 microns. In another instance, the average thickness of the first portion 202 may be not greater than 5 microns, such as not greater than 3 microns, not greater than 2 microns, not greater than 1 microns, not greater than 0.9 microns, not greater than 0.8 microns, not greater than 0.7 microns, not greater than 0.6 microns, not greater than 0.5 microns, not greater than 0.4 microns, not greater than 0.3 microns, or not greater than 0.2 microns. Moreover, the average thickness of the first portion 202 can be in a range including any of the minimum and maximum values noted herein.

In an embodiment, the first portion 202 of the coating can include a ceramic material consisting essentially of silica. In an aspect, the first portion 202 of the coating can consist essentially of a polycrystalline material including silica. In another aspect, the first portion 202 of the coating can be essentially free of an amorphous phase. In another embodiment, the first portion 202 of the coating can include a vitreous material including silica. In an aspect, the first portion 202 can include an amorphous phase including silica. In a particular aspect, the first portion 202 can include an amorphous phase consisting essentially of silica. In another particular aspect, the first portion 202 can include a particular amount of amorphous phase that can facilitate improved formation and property of the abrasive grains 210 and abrasive articles including the abrasive grains 210. For example, at least 1 vol % of the total volume of the first portion 202 can be an amorphous phase, such as at least 3 vol %, at least 5 vol %, at least 10 vol %, at least 30 vol %, at least 35 vol %, at least 37 vol %, at least 39 vol %, at least 45 vol %, at least 50 vol %, at least 60 vol %, at least 65%, at least 70 vol %, at least 75 vol %, at least 80 vol %, at least 85 vol %, at least 90 vol %, or at least 95 vol % of the first portion can be an amorphous phase. In a further particular aspect, not greater than 99 vol % of the total volume of the first portion 202 may be amorphous phase, such as not greater than 97 vol %, not greater than 95 vol %, not greater than 90 vol %, not greater than 85 vol %, not greater than 80 vol %, not greater than 75 vol %, not greater than 70 vol %, not greater than 65 vol %, not greater than 60 vol %, not greater than 50 vol %, not greater than 45 vol %, not greater than 40 vol %, not greater than 33 vol %, or not greater than 31 vol % of the first portion 202 may be amorphous phase. Moreover, the first portion 202 can include amorphous phase in a range including any of the minimum and maximum percentages noted herein.

In another aspect, the first portion 202 can include silica in an amorphous phase and in a crystalline phase. In another particular aspect, the first portion 202 can include an amorphous phase consisting essentially of silica and a crystalline phase consisting essentially of silica.

In an aspect, the first portion 202 can include a crystalline phase of at least 1 vol % of the total volume of the first portion 202, such as at least 3 vol %, at least 5 vol %, at least 10 vol %, at least 20 vol %, at least 30 vol %, at least 35 vol %, at least 37 vol %, at least 39 vol %, at least 45 vol %, at least 50 vol %, at least 60 vol %, at least 65%, at least 70 vol %, at least 75 vol %, at least 80 vol %, at least 85 vol %, at least 90 vol %, or at least 95 vol % of crystalline phase of the first portion. In a further aspect, not greater than 99 vol % of the total volume of the first portion 202 may be crystalline phase, such as not greater than 97 vol %, not greater than 95 vol %, not greater than 90 vol %, not greater than 85 vol %, not greater than 80 vol %, not greater than 75 vol %, not greater than 70 vol %, not greater than 65 vol %, not greater 63 vol %, not greater than 61 vol %, not greater than 50 vol %, not greater than 40 vol %, not greater than 33 vol %, or not greater than 20 vol % of the first portion 202 may be crystalline phase. Moreover, the first portion 202 can include crystalline phase in a range including any of the minimum and maximum percentages noted herein.

In another aspect, the first portion 202 can include a particular crystallinity that can facilitate improved formation and property of the abrasive grains 210 and abrasive articles including the abrasive grains 210. Crystallinity can be determined by performing X-ray diffraction (also referred to as "XRD" in this disclosure) analysis on a powder sample of the first portion 202 prepared as follows. The first material can be disposed in an alumina crucible and heated in a furnace at sintering temperature noted in embodiments herein for 30 min. Then the crucibles can be taken out of the furnace and left to cool down at ambient temperature (i.e., 20° C. to 25° C.). The solids can be recovered from the crucibles and milled manually, such as using mortar and pestle, to obtain the powder sample of the first portion 202. XRD can be acquired in Bragg-Brentano configuration (standard for powder XRD) using a copper X-ray source having Cu K alpha wavelength of 1.54 Angstrom. Identification of crystalline phase can be performed using the EVA Bruker AXS software or another equivalent software, and the ICDD-PDF4+database (Release 2020). Crystallinity can be determined by Rietveld refinement using the TOPAS 4.2 software from Bruker or another equivalent software following the Corindon $Al_2O_3$ standard.

In a particular aspect, the first portion 202 can include a crystallinity percentage of at least 1%, at least 3%, at least 5%, at least 10%, at least 20%, at least 30%, at least 40%, at least 55%, at least 61%, or at least 63%. In another aspect, the first portion 202 may include not greater than 90% crystallinity, such as not greater than 80%, not greater than 75%, not greater than 70%, not greater than 65%, not greater than 63%, not greater than 61%, not greater than 55%, not greater than 50%, not greater than 40%, not greater than 30%, not greater than 20%, not greater than 10%, not greater than 5%, or not greater than 3% crystallinity. Moreover, the first portion 202 can include crystallinity in a range including any of the minimum and maximum percentages noted herein.

In a further aspect, a majority of the first portion 202 of the coating can be silica. For example, at least 51 wt. % of the first portion 202 of the coating can be silica, such as at least 52 wt. %, at least 53 wt. %, at least 54 wt. %, at least 55 wt. %, at least 56 wt. %, at least 57 wt. %, at least 58 wt. %, at least 59 wt. %, at least 60 wt. %, at least 61 wt. %, at least 62 wt. %, at least 63 wt. %, at least 64 wt. %, at least 65 wt. %, at least 66 wt. %, at least 67 wt. %, at least 68 wt. %, at least 69 wt. %, at least 70 wt. %, at least 71 wt. %, at least 72 wt. %, at least 73 wt. %, at least 74 wt. %, at least 75 wt. %, at least 76 wt. %, at least 77 wt. %, at least 78 wt. %, at least 79 wt. %, at least 80 wt. %, at least 81 wt. %, at least 82 wt. %, at least 83 wt. %, at least 84 wt. %, at least 85 wt. %, at least 86 wt. %, at least 87 wt. %, at least 88 wt. %, at least 89 wt. %, at least 90 wt. %, at least 91 wt. %, at least 92 wt. %, at least 93 wt. %, at least 94 wt. %, at least 95 wt. %, at least 96 wt. %, at least 97 wt. %, at least 98 wt. %, or at least 99 wt. % of the first portion 202 of the coating can be silica. In another aspect, the first portion 202 can consist essentially of silica.

In an embodiment, the first portion of the coating can include domains having a particular average domain size that can facilitate improved formation and performance of the abrasive particles.

FIGS. 8A to 8C include atomic force microscopic (also referred to as "AFM" in this disclosure) phase images of abrasive particles. FIG. 8A includes an image of the core 801 including crystallites 810. FIG. 8B includes an image of the coating 802 overlying a core (not illustrated), wherein the coating is dried at a temperature of approximately 250° C. FIG. 8C includes an image of an exemplary first portion of the coating 803 according to an embodiment. The first portion of the coating 803 can be formed by sintering. As illustrated in FIG. 8C, the first portion of the coating 803 can include domains 830. As illustrated, the first portion of the coating 803 can have a greater average domain size than the average domain size of domains 820 present in the coating 802.

In an aspect, the first portion of the coating can include domains having an average domain size of greater than 19 nm, such as at least 20 nm, at least 22 nm, at least 25 nm, or at least 28 nm. In another aspect, the average domain size can be at most 130 nm, at most 126 nm, at most 120 nm, at most 100 nm, at most 90 nm, at most 85 nm, at most 83 nm, at most 80 nm, at most 78 nm, at most 75 nm, at most 72 nm, at most 70 nm, at most 68 nm, at most 65 nm, at most 62 nm, at most 60 nm, at most 58 nm, at most 55 nm, at most 52 nm, or at most 50 nm. In another particular aspect, the average domain size can be less than 56 nm. Moreover, the first portion of the coating can include an average domain size including any of the minimum and maximum values noted herein. As used herein, average domain size is intended to refer to the average value of the largest dimensions of at least 20 identifiable domains in the phase images of randomly selected abrasive particles.

In an embodiment, the first portion of the coating can include a particular roughness that can facilitate improved formation and performance of the abrasive particles. In an aspect, the first portion of the coating can include an average root-mean-square roughness (Rq). Root-mean-square roughness (Rq) can be determined as follows. AFM scans can be acquired over 500×500 nm² to 2000×2000 nm² of the surface of the abrasive particle 200. Roughness was determined on areas of approximately. 200×200 nm² (i.e., 190× 190 nm² to 210×210 nm²) over 5 random areas, typically at center, top-left, top-right, bottom-left and bottom-right of the images. The average value of root-mean-square roughness (Rq) obtained from at least 20 images of randomly selected abrasive particles is referred to as average root-mean-square roughness (Rq). In an example, the average root-mean-square roughness (Rq) can be less than 6 nm, such as at most 5.5 nm, at most 5 nm, at most 4.6 nm, at most 4 nm, at most 3.7 nm, at most 3.5 nm, or at most 3 nm. In another example, the average root-mean-square roughness (Rq) can be greater than 0.5 nm, such as greater than 1 nm, at least 1.5 nm, at least 2 nm, at least 2.5 nm, at least 2.8 nm, or at least 3 nm. Moreover, the first portion of the coating can include an average root-mean-square roughness (Rq) in a range including any of the minimum and maximum values noted herein.

Referring to FIG. 1, at block 102, the process can include forming a second portion of the coating overlying at least a portion of the core. Forming the second portion can include treating abrasive particles 200 with a second material. In an embodiment, the second material can include a coupling agent, for example, a silicon-containing compound, such as a silane or another organosilicon compound. In particular, the second material can include organosilicon coupling agents that can provide improved binding between a surface having—OH functional groups and organic polymeric materials. For instance, the second material can include organosilanes having amino, alkoxy, alkylalkoxy, alkyltrialkoxy, vinyl, acrylo, methacrylo, mercapto, or other functional groups, or any combination thereof. Particular example of silanes can include aminosilanes including, for instance, bis-aminosilane, aminoalkyltrialkoxysilanes, aminoethyltriethoxysilane, aminopropyltriethoxysilane, phenylaminoalkyltrialkoxysilane, or any combination thereof. Further example of organosilicon compound can include siloxanes, silicone fluids, silsesquioxanes, or the like, or any combination thereof.

In an exemplary implementation, abrasive particles 200 can be wetted with a solution including a silane in a solvent, such as water or ethanol. The concentration of silane can be in a range, for example, from 2 vol % to 6 vol %. In other implementations, spraying in-situ or other methods known in the art may be used to coat abrasive particles 200 with the second material.

Forming the second portion of the coating may further include drying the wetted or otherwise coated abrasive particles 200. Drying may be conducted at a temperature from 20° C. to 180° C. for 10 minutes to up to 36 hours for the second portion the coating.

Referring to FIG. 2B, a cross section of an abrasive particle 210 is illustrated. The abrasive particle 210 includes the core 201 and the coating 205 overlying the core 201. The coating 205 includes the first portion 202 overlying the core 201 and a second portion 203 overlying the first portion 202 and the core 201. The first portion 202 is between the surface of the core 201 and the second portion 203. The second portion 203 can be in direct contact with the first portion 202. In an embodiment, the second portion 203 can overlie the entire surface of the core 201, the entire first portion 202, or both. In one embodiment, the second portion 203 can overlie a majority of the first portion 202. For instance, a portion of the first portion 202 may not be covered by the second portion 203. In one embodiment, a portion of the core surface can be in direct contact with the second portion 203. In a further embodiment, the second portion 203 can bond to the first portion 202 and bond to the core 201.

In an embodiment, the second portion 203 of the coating 205 can include silane or a silane reaction product. The silane reaction product is intended to refer to a silane derivative that may be formed in the process of forming the coating.

In an embodiment, the coating 205 of abrasive particles 210 can include silicon in a particular content that can facilitate improved formation and properties of abrasive particles 210. In an aspect, the content of silicon of abrasive particles 210 can be determined by Energy Dispersive Spectroscopy and can include an average Energy Dispersive Spectroscopy value. As used herein, an average Energy Dispersive Spectroscopy value of an element is intended to refer to an average of the peak values of that element as shown in the Energy Dispersive Spectroscopy readouts of at least 5 abrasive particles 210.

In an example, abrasive particles 210 can include an average Silicon Energy Dispersive Spectroscopy value of at least 0.39, such as at least 0.41, at least 0.43, at least 0.45, at least 0.47, at least 0.48, at least 0.49, at least 0.50, at least 0.51, at least 0.52, at least 0.54, at least 0.55, at least 0.56, at least 0.57, at least 0.59, at least 0.60, at least 0.61, at least 0.62, at least 0.64, at least 0.66, at least 0.67, at least 0.69, at least 0.70, at least 0.72, at least 0.74, at least 0.75, at least 0.77, at least 0.78, at least 0.79, at least 0.81, at least 0.83, at least 0.85, at least 0.87, at least 0.89, at least 0.90, at least 0.92, at least 0.93, at least 0.94, at least 0.95, at least 0.96, at least 0.97, at least 0.99, at least 1.00, at least 1.10, at least 1.15, at least 1.20, at least 1.25, at least 1.30, at least 1.35, at least 1.40, at least 1.45, at least 1.50, at least 1.55, at least 1.60, at least 1.65, at least 1.70, at least 1.75, at least 1.80, at least 1.85, at least 1.90, at least 1.95, at least 2.00, at least 2.10, at least 2.15, at least 2.20, at least 2.25, at least 2.30, at least 2.35, at least 2.40, at least 2.45, at least 2.50, at least 2.55, at least 2.60, at least 2.65, at least 2.70, at least 2.75, at least 2.80, at least 2.85, at least 2.90, at least 2.95, or at least 3.00. In another example, the average Silicon Energy Dispersive Spectroscopy value may be not greater than 6.00, not greater than 5.95, not greater than 5.90, not greater than 5.85, not greater than 5.80, not greater than 5.75, not greater than 5.60, not greater than 5.50, not greater than 5.45, not greater than 5.35, not greater than 5.20, not greater than 5.10, not greater than 5.00, not greater than 4.95, not greater than 4.90, not greater than 4.85, not greater than 4.80, not greater than 4.75, not greater than 4.60, not greater than 4.50, not greater than 4.45, not greater than 4.35, not greater than 4.20, not greater than 4.10, not greater than 4.00, not greater than 3.95, not greater than 3.90, not greater than 3.85, not greater than 3.80, not greater than 3.75, not greater than 3.60, not greater than 3.50, not greater than 3.45, not greater than 3.35, not greater than 3.20, or not greater than 3.10. Moreover, the abrasive particles 210 can include an average Silicon Energy Dispersive Spectroscopy value in a range including any of the minimum and maximum values noted herein.

In a further embodiment, the core 201 can include a ceramic material including an element forming a cation of the ceramic material, and the abrasive particles 210 can include an average Energy Dispersive Spectroscopy value of the cation (also referred to as "$EDS_{Cation}$"). Abrasive particles 210 may further include a particular average Silicon/Cation Energy Dispersive Spectroscopy Percentage that can facilitate improved formation and properties of abrasive particles 210. As used herein, average Silicon/Cation Energy Dispersive Spectroscopy Percentage is determined by the formula, $[EDS_{Si}/EDS_{Cation}] \times 100\%$, wherein $EDS_{Si}$ is the average Silicon Energy Dispersive Spectroscopy value.

For example, the average Silicon/Cation Energy Dispersive Spectroscopy Percentage can be at least 0.87%, such as at least 0.9%, at least 1.0%, at least 1.2%, at least 1.5%, at least 1.7%, at least 1.9%, at least 2.0%, at least 2.1%, at least 2.2%, at least 2.4%, at least 2.7%, at least 2.9%, at least 3.0%, at least 3.1%, at least 3.3%, at least 3.5%, at least 3.7%, at least 3.9%, at least 4.1%, at least 4.3%, at least 4.5%, at least 4.7%, at least 4.9%, at least 5.0%, at least 5.1%, at least 5.2%, at least 5.4%, at least 5.6%, at least 5.8%, at least 6.0%, at least 6.1%, at least 6.3%, at least 6.5%, at least 6.7%, at least 6.9%, at least 7.0%, or at least 7.1%. In another example, the average Silicon/Cation Energy Dispersive Spectroscopy Percentage can be not greater than 10.0%, not greater than 9.9%, not greater than 9.7%, not greater than 9.5%, not greater than 9.3%, not greater than 9.1%, not greater than 9.0%, not greater than 8.9%, not greater than 8.7%, not greater than 8.5%, not greater than 8.4%, not greater than 8.3%, not greater than 8.1%, not greater than 8.0%, not greater than 7.9%, not greater than 7.8%, not greater than 7.6%, not greater than 7.5%, not greater than 7.4%, not greater than 7.3%, or not greater than 7.2%. Moreover, abrasive particles 210 can include an average Silicon/Cation Energy Dispersive Spectroscopy Percentage in a range including any of the minimum and maximum percentages noted herein.

In an aspect, the element forming the cation can include aluminum, zirconium, magnesium, or a combination thereof. In a particular aspect, the element forming the cation can consist of aluminum. In another particular aspect, abrasive particles 210 can include an average Silicon/Aluminum Energy Dispersive Spectroscopy Percentage including any of the average Silicon/Cation Energy Dispersive Spectroscopy Percentages noted herein.

In an embodiment, abrasive particles 210 can include an average Energy Dispersive Spectroscopy value of an element selected from the group consisting of alkali metal and alkaline earth metal of not greater than 2.0, such as not greater than 1.9, not greater than 1.8, not greater than 1.7, not greater than 1.6, not greater than 1.5, not greater than 1.4, not greater than 1.3, not greater than 1.2, not greater than 1.1, not greater than 1.0, not greater than 0.9, not greater than 0.8, not greater than 0.7, or not greater than 0.6. In a particular embodiment, the coating 205 can be essentially free of an element selected from alkali and alkaline earth metal or any combination thereof.

In an aspect, abrasive particles 210 can include an average Sodium Energy Dispersive Spectroscopy value of not greater than 1, such as not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01. In another aspect, abrasive particles 210 can include a ratio of average Silicon Energy Dispersive Spectroscopy Value to average Sodium Energy Dispersive Spectroscopy Value (also referred to as "Silicon/Sodium Energy Dispersive Spectroscopy ratio") of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100. In a particular aspect, the coating 205 can be essentially free of sodium.

In a further aspect, abrasive particles 210 may include an average Potassium Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01. In a further aspect, abrasive particles 210 can include a ratio of average Silicon Energy Dispersive Spectroscopy Value to average Potassium Energy Dispersive Spectroscopy Value (also referred to as "Silicon/Potassium Energy Dispersive Spectroscopy ratio") of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100. In a particular aspect, the coating 205 can be essentially free of potassium. In an aspect, abrasive particles 210 can include an average Calcium Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01. In another aspect, abrasive particles 210 can include a ratio of average Silicon Energy Dispersive Spectroscopy value to average Calcium Energy Dispersive Spectroscopy Vale (also referred to as "Silica/Calcium Energy Dispersive Spectroscopy ratio") of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100. In a particular aspect, the coating 205 can be essentially free of calcium.

In an aspect, abrasive particles 210 can include an average Magnesium Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01. In another aspect, abrasive particles 210 can include a ratio of average Silicon Energy Dispersive Spectroscopy Value to average Magnesium Energy Dispersive Spectroscopy Value (also referred to as "Silica/Magnesium Energy Dispersive Spectroscopy ratio") of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100. In a particular aspect, the coating 205 can be essentially free of magnesium.

In an aspect, abrasive particles 210 may include an average Barium Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01. In another aspect, abrasive particles 210 may include a ratio of average Silicon Energy Dispersive Spectroscopy Value to average Barium Energy Dispersive Spectroscopy Value (also referred to as "Silicon/Barium Energy Dispersive Spectroscopy ratio") of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100. In a particular aspect, the coating 205 can be essentially free of barium.

In an embodiment, abrasive particles 210 may include an average Boron Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01. In a further embodiment, abrasive particles 210 may include a ratio of average Silicon Energy Dispersive Spectroscopy Value to average Boron Energy Dispersive Spectroscopy Value (also referred to as "Silicon/Boron Energy Dispersive Spectroscopy ratio") of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100. In a particular embodiment, the coating 205 can be essentially free of boron.

In an embodiment, abrasive particles 210 may include an average Energy Dispersive Spectroscopy Value of an element selected from transition metal of not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01. In a further embodiment, abrasive particles 210 may include a ratio of average Silicon Energy Dispersive Spectroscopy Value to average Energy Dispersive Spectroscopy Value of transition metal (also referred to as "Silicon/$T_M$ Energy Dispersive Spectroscopy ratio") of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100. In a particular embodiment, the coating 205 can be essentially free of an element selected from transitional metal or any combination thereof. For example, the coating 205 can be essentially free of iron, cobalt, nickel, boron, aluminum, or any combination thereof. In an embodiment, abrasive particles 210 can include a particular average content of the coating 205 that can facilitate improved formation and properties of abrasive particle 210. For example, abrasive particle 210 can include an average content of the coating 205 of at least 0.01 wt. % for the weight of the core 201, such as at least 0.02 wt. %, at least 0.03 wt. %, at least 0.04 wt. %, at least 0.05 wt. %, at least 0.06 wt. %, at least 0.07 wt. %, at least 0.08 wt. %, at least 0.09 wt. %, at least 0.1 wt. %, at least 0.15 wt. %, at least 0.16 wt. %, at least 0.17 wt. %, at least 0.18 wt. %, at least 0.19 wt. %, at least 0.2 wt. %, at least 0.25 wt. %, at least 0.26 wt. %, at least 0.27 wt. %, at least 0.28 wt. %, at least 0.29 wt. %, or at least 0.3 wt. % for a weight of the core 201. As used herein, an average content of coating 205 can be an average of the coating contents of at least 5 abrasive particles 210. In another instance, abrasive particles 210 may include an average content of the coating 205 of not greater than 1 wt. % for the weight of the core 201, not greater than 0.9 wt. %, not greater than 0.8 wt. %, not greater than 0.7 wt. %, not greater than 0.6 wt. %, not greater than 0.55 wt. %, not greater than 0.5 wt. %, not greater than 0.48 wt. %, not greater than 0.46 wt. %, not greater than 0.45 wt. %, not greater than 0.43 wt. %, not greater than 0.42 wt. %, not greater than 0.41 wt. %, not greater than 0.4 wt. %, not greater than 0.38 wt. %, not greater than 0.37 wt. %, not greater than 0.36 wt. %, not greater than 0.35 wt. %, or not greater than 0.34 wt. % for the weight of the core 201. Moreover, abrasive particles 210 can include an average content of coating 205 in a range including any of the minimum and maximum percentages noted herein. In an embodiment, abrasive particles 210 can include a particular average thickness of coating 205 that can facilitate improved formation and properties of abrasive particle 210. For example, abrasive particle 210 may include an average thickness of coating 205 of not greater than 10 microns, not greater than 9 microns, not greater than 8 microns, not greater than 7 microns, not greater than 6 microns, not greater than 5 microns, not greater than 4 microns, not greater than 3 microns, not greater than 2 microns, not greater than 1 microns, not greater than 0.9 microns, not greater than 0.8 microns, not greater than 0.7 microns, not greater than 0.6 microns, not greater than 0.5 microns, not greater than 0.4 microns, not greater than 0.3 microns, or not greater than 0.2 microns. In another example, abrasive particle 210 can include an average thickness of coating 205 of at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16 microns, at least 0.17 microns, at least 0.18 microns, at least 0.19 microns, at least 0.20 microns, at least 0.21 microns, at least 0.22 microns, at least 0.24 microns, at least 0.26 microns, at least 0.28 microns, at least 0.29 microns, at least 0.30 microns, or at least 0.31 microns. Moreover, abrasive particles 210 can include an average thickness of coating 205 in a range including any of the minimum and maximum percentages noted herein. As used herein, an average thickness of coating 205 can refer to an average of thickness of coating 205 of at least 5 abrasive particles 210.

In an embodiment, abrasive particles 210 can include a particular ratio of an average thickness of coating 205 to an average particle size of core 201 that can facilitate improved formation and properties of abrasive particle 210. For example, the ratio can be less than 1, such as not greater than 0.9, not greater than 0.7, not greater than 0.5, not greater than 0.4, not greater than 0.2, not greater than 0.1, not greater than 0.08, not greater than 0.06, not greater than 0.05, not greater than 0.03, not greater than 0.02, not greater than 0.01, not greater than 0.009, not greater than 0.008, not greater than 0.007, not greater than 0.006, not greater than 0.005, not greater than 0.004, not greater than 0.003, not greater than 0.002, or not greater than 0.1. In another instance, the ratio of an average thickness of coating 205 to an average particle size of core 201 can be at least 0.0005, at least 0.0007, at least 0.0009, at least 0.001, at least 0.002, at least 0.003, at least 0.004, at least 0.005, at least 0.006, at least 0.007, at least 0.008, at least 0.009, at least 0.01, at least 0.02, or at least 0.03. Moreover, the ratio of an average thickness of coating 205 to an average particle size of core 201 can be in a range including any of the minimum and maximum percentages noted herein. As used herein, the average particle size of core 201 is intended to refer to $D_{50}$ of core 201.

In an embodiment, abrasive particles 210 can include an average particle size (i.e., $D_{50}$) of at least 10 microns, at least 30 microns, at least 40 microns, at least 50 microns, at least 60 microns, at least 70 microns, at least 80 microns, at least 90 microns, at least 100 microns, at least 120 microns, at least 140 microns, at least 150 microns, at least 170 microns, at least 180 microns, at least 200 microns, at least 210 microns, at least 230 microns, at least 250 microns, at least 260 microns, at least 270 microns, at least 290 microns, at least 300 microns, at least 320 microns, at least 340 microns, at least 350 microns, at least 360 microns, at least 380 microns, at least 400 microns, at least 420 microns, at least 430 microns, at least 440 microns, at least 450 microns, at least 460 microns, at least 470 microns, at least 490 microns, or at least 500 microns. In another embodiment, abrasive particles 210 may include an average particle size of not greater than 3 mm, such as not greater than 2 mm, not greater than 1.8 mm, not greater than 1.6 mm, not greater than 1.5 mm, not greater than 1.2 mm, not greater than 1 mm, not greater than 900 microns, not greater than 850 microns, not greater than 830 microns, not greater than 800 microns, not greater than 750 microns, not greater than 700 microns, not greater than 650 microns, not greater than 600 microns, not greater than 550 microns, not greater than 500 microns, not greater than 450 microns, or not greater than 400 microns. Moreover, abrasive particles 210 can include an average particle size in a range including any of the minimum and maximum values noted herein.

In an embodiment, coating 205 can include a polycrystalline material. In an aspect, a majority of coating 205 can be polycrystalline. For example, at least 51 vol % of a total volume of coating 205 can be polycrystalline, such as at least 52 vol %, at least 53 vol %, at least 54 vol %, at least 55 vol %, at least 56 vol %, at least 57 vol %, at least 58 vol %, at least 59 vol %, at least 60 vol %, at least 61 vol %, at least 62 vol %, at least 63 vol %, at least 64 vol %, at least 65 vol %, at least 66 vol %, at least 67 vol %, at least 68 vol %, at least 69 vol %, at least 70 vol %, at least 71 vol %, at least 72 vol %, at least 73 vol %, at least 74 vol %, at least 75 vol %, at least 76 vol %, at least 77 vol %, at least 78 vol %, at least 79 vol %, at least 80 vol %, at least 81 vol %, at least 82 vol %, at least 83 vol %, at least 84 vol %, at least 85 vol %, at least 86 vol %, at least 87 vol %, at least 88 vol %, at least 89 vol %, at least 90 vol %, at least 91 vol %, at least 92 vol %, at least 93 vol %, at least 94 vol %, at least 95 vol %, at least 96 vol %, at least 97 vol %, at least 98 vol %, or at least 99 vol % of the total volume of coating 205 can be polycrystalline. In a particular aspect, coating 205 consist essentially of a polycrystalline material. In another particular aspect, coating 205 can be essentially free of an amorphous phase.

In a particular embodiment, a majority of coating 205 can be silica. For instance, at least 51 wt. % of a total weight of coating 205 can be silica, such as at least 52 wt. %, at least 53 wt. %, at least 54 wt. %, at least 55 wt. %, at least 56 wt. %, at least 57 wt. %, at least 58 wt. %, at least 59 wt. %, at least 60 wt. %, at least 61 wt. %, at least 62 wt. %, at least 63 wt. %, at least 64 wt. %, at least 65 wt. %, at least 66 wt. %, at least 67 wt. %, at least 68 wt. %, at least 69 wt. %, at least 70 wt. %, at least 71 wt. %, at least 72 wt. %, at least 73 wt. %, at least 74 wt. %, at least 75 wt. %, at least 76 wt. %, at least 77 wt. %, at least 78 wt. %, at least 79 wt. %, at least 80 wt. %, at least 81 wt. %, at least 82 wt. %, at least 83 wt. %, at least 84 wt. %, at least 85 wt. %, at least 86 wt.

%, at least 87 wt. %, at least 88 wt. %, at least 89 wt. %, at least 90 wt. %, at least 91 wt. %, at least 92 wt. %, at least 93 wt. %, at least 94 wt. %, or at least 95 wt. % of a total weight of coating 205 can be silica. In a particular aspect, coating 205 can consist essentially of silica.

In a further embodiment, coating 205 can include a polycrystalline material including silica grains having a particular average crystallite size that can facilitate improved properties of abrasive grains 210. For instance, the silica grains can have an average crystallite size of at least 0.01 microns, at least, at least 0.02 microns, at least 0.03 microns, at least 0.04 microns, at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16, at least 0.17 microns, at least 0.18 microns, at least 0.19 microns, at least 0.2 microns, at least 0.3 microns, at least 0.4 microns, at least 0.5 microns, at least 0.6 microns, at least 0.7 microns, at least 0.8 microns, at least 0.9 microns, at least 1 micron, at least 1.2 microns, at least 1.4 microns, at least 1.6 microns, at least 1.8 microns, at least 2 microns, at least 2.3 microns, at least 2.6 microns, at least 2.8 microns, at least 3 microns, at least 3.2 microns, at least 3.4 microns, at least 3.6 microns, at least 3.8 microns, at least 4 microns, at least 4.2 microns, at least 4.5 microns, at least 4.8, at least 5 microns, at least 5.2 microns, at least 5.4 microns, at least 5.5 microns, at least 5.7 microns, at least 6 microns, at least 6.2 microns, at least 6.3 microns, at least 6.5 microns, at least 6.7 microns, at least 6.8 microns, at least 7 microns, at least 7.2 microns, at least 7.4 microns, at least 7.5 microns, at least 7.8 microns, at least 8 microns, at least 8.1 microns, at least 8.3 microns, at least 8.5 microns, at least 8.6 microns, at least 8.7 microns, at least 8.9 microns, at least 9 microns, at least 9.1 microns, at least 9.3 microns, at least 9.4 microns, at least 9.6 microns, at least 9.8 microns, or at least 10 microns. In another instance, the silica grains may have an average crystallite size of not greater than 10 microns, not greater than 9.8 microns, not greater than 9.6 microns, not greater than 9.4 microns, not greater than 9.2 microns, not greater than 9 microns, not greater than 8.7 microns, not greater than 8.5 microns, not greater than 8.3 microns, not greater than 8.1 microns, not greater than 8 microns, not greater than 7.8 microns, not greater than 7.6 microns, not greater than 7.4 microns, not greater than 7.2 microns, not greater than 7 microns, not greater than 6.8 microns, not greater than 6.6 microns, not greater than 6.4 microns, not greater than 6.3 microns, not greater than 6.2 microns, not greater than 6 microns, not greater than 5.8 microns, not greater than 5.6 microns, not greater than 5.4 microns, not greater than 5.3 microns, not greater than 5 microns, not greater than 4.8 microns, not greater than 4.6 microns, not greater than 4.4 microns, not greater than 4.2 microns, not greater than 4 microns, not greater than 3.8 microns, not greater than 3.6 microns, not greater than 3.4 microns, not greater than 3.2 microns, not greater than 2.9 microns, not greater than 2.8 microns, not greater than 2.6 microns, not greater than 2.4 microns, not greater than 2.2 microns, not greater than 2 microns, not greater than 1.8 microns, not greater than 1.6 microns, not greater than 1.4 microns, not greater than 1.2 microns, not greater than 1 microns, not greater than 0.9 microns, not greater than 0.8 microns, not greater than 0.7 microns, not greater than 0.6 microns, not greater than 0.5 microns, not greater than 0.4 microns, not greater than 0.3 microns, not greater than 0.2 microns, not greater than 0.1 microns, not greater than 0.09 microns, not greater than 0.08 microns, not greater than 0.07 microns, not greater than 0.06 microns, not greater than 0.05 microns, not greater than 0.04 microns, not greater than 0.03 microns, not greater than 0.02 microns, or not greater than 0.01 microns. Moreover, the coating 250 can include silica grains having an average crystallite size in a range including any of the minimum and maximum values noted herein.

Figure 9:
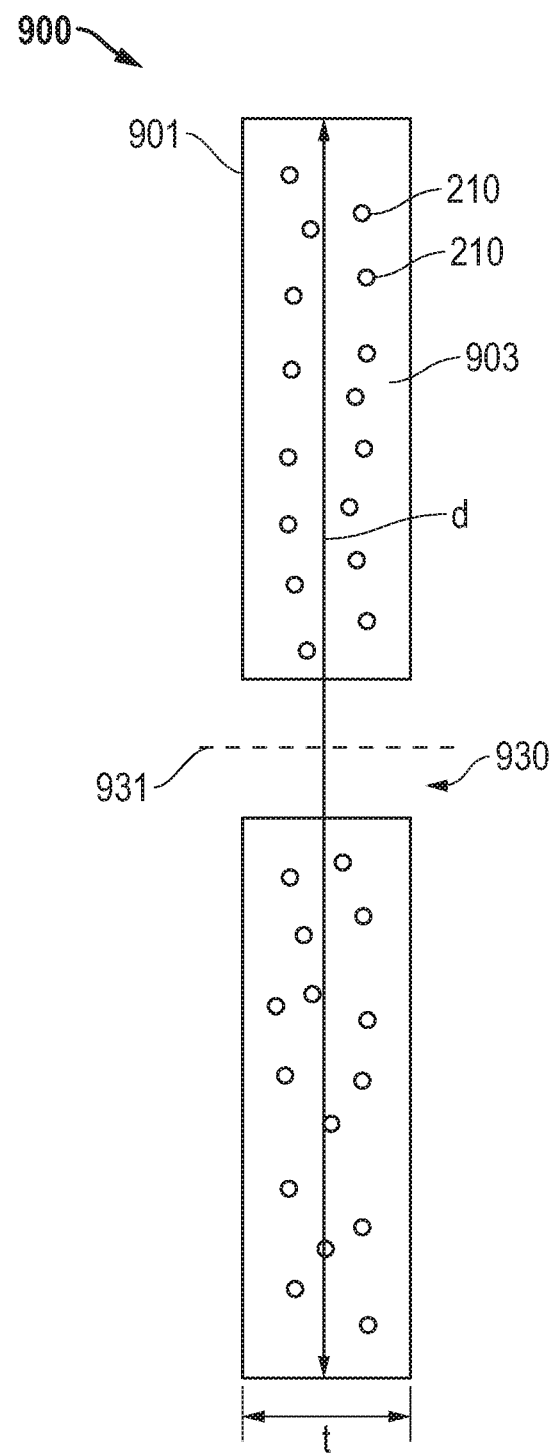
FIG. 9 includes an illustration of a cross section of a bonded abrasive article according to an embodiment.

In a further embodiment, first portion 202 of coating 205 can consist essentially of silica grains. In another embodiment, the majority of coating 205 can consist essentially of silica grains. In at least one embodiment, coating 205 can consist essentially of silica grains. FIG. 9 includes cross-sectional illustration of a bonded abrasive article 900 including a body 901 including abrasive particles 210 contained within a bond material 903. In at least one embodiment, the bond material 903 defines an interconnected and continuous phase throughout the entire volume of the body 901. In another embodiment, the bond material 903 can form a three-dimensional matrix.

In an embodiment, the abrasive particles 210 can bond to the bond material 903. In a further embodiment, a portion of the coating 203 can cross link to the bond material 903. For example, silane or silane derivative can cross link to the bond material in the process of forming the body 901. In an embodiment, the bond material 903 can include an organic material, an inorganic material, a ceramic material, a vitreous material, a metal, or a metal alloy material. In a particular embodiment, the bond material 903 can include an organic material, such as one or more natural organic materials, synthetic organic materials, or a combination thereof. In particular instances, the organic material can be made of a resin, which may include a thermoset, a thermoplastic, and a combination thereof. For example, some suitable resins can include phenolics, epoxies, polyesters, cyanate esters, shellacs, polyurethanes, polybenzoxazines, polybismaleimides, polyimides, rubber, and a combination thereof.

The phenolic resin may be modified with a curing or cross-linking agent, such as hexamethylene tetramine. At temperatures in excess of about 90° C., some examples of the hexamethylene tetramine may form crosslinks to form methylene and dimethylene amino bridges that help cure the resin. The hexamethylene tetramine may be uniformly dispersed within the resin. More particularly, hexamethylene tetramine may be uniformly dispersed within resin regions as a cross-linking agent. Even more particularly, the phenolic resin may contain resin regions with cross-linked domains having a sub-micron average size. In an embodiment, the body 901 can include a certain content of the bond material 903 that can facilitate improved formation of abrasive articles. In an instance, the body 901 may include not greater than 98 vol % the bond material 903 for a total volume of the body, or not greater than 95 vol %, or not greater than 90 vol %, or not greater than 85 vol %, or not greater than 80 vol %, or not greater than 75 vol %, or not greater than 70 vol %, or not greater than 65 vol %, or not greater than 60 vol %, or not greater than 55 vol %, or not greater than 50 vol %, or not greater than 45 vol %, or not greater than 40 vol %, or not greater than 35 vol %, or not greater than 30 vol %, or not greater than 25 vol %. In another instance, the body 101 can include at least 1 vol % the bond material 103 for a total volume of the body, or at least 2 vol %, or at least 5 vol %, or at least 10 vol %, or at least 20 vol %, or at least 30 vol %, or at least 35 vol %, or at least 40 vol %, or at least 45 vol %. Moreover, the body 901 can include bond material 903 in a content including any of the minimum and maximum percentages noted herein.

In an embodiment, the body 901 can include a certain content of abrasive particles 210 that can facilitate improved properties and performance of abrasive articles. In an example, the body 901 may include not greater than 65 vol % abrasive particles 105 for a total volume of the body 901, such as not greater than 64 vol %, or not greater than 62 vol %, or not greater than 60 vol %, or not greater than 58 vol %, or not greater than 56 vol %, or not greater than 54 vol %, or not greater than 52 vol %, or not greater than 50 vol %, or not greater than 48 vol %, or not greater than 46 vol %, or not greater than 44 vol %, or not greater than 42 vol %, or not greater than 40 vol %, or not greater than 38 vol %, or not greater than 36 vol %, or not greater than 34 vol %, or not greater than 32 vol %, or not greater than 30 vol %, or not greater than 28 vol %, or not greater than 26 vol %, or not greater than 24 vol %, or not greater than 22 vol %, or not greater than 20 vol %. In another example, the body 101 can include at least 1 vol % abrasive particles 105 for a total volume of the body, such as at least 2 vol %, or at least about 4 vol %, or at least 6 vol %, or at least 8 vol %, or at least 10 vol %, or at least 12 vol %, or at least 14 vol %, or at least 16 vol %, or at least 18 vol %, or at least 20 vol %, or at least 25 vol %, or at least 30 vol %, or at least 35 vol % abrasive particles 210 for a total volume of the body 901. Moreover, the body 901 can include a content of abrasive particles 210 in a range including any of the minimum and maximum percentages noted herein.

In at least one embodiment, the body 901 can include abrasive particles 210 including cores 201 having at least one different characteristics including composition, shape, hardness, particle size, friability, toughness, crystallite size, or any combination thereof. For example, cores 201 can include shaped abrasive particles and non-shaped particles or abrasive particles having different shapes. In a further instance, cores 201 can include a first type of abrasive particle including a premium abrasive particle (e.g., fused alumina, alumina-zirconia, seeded sol gel alumina, shaped abrasive particle, etc.) and a second type of abrasive particle including a diluent abrasive particle.

Referring to FIG. 9, the body 901 further includes a central opening 930 and an axial axis 131 extending through the central opening 930 in the axial direction, which can be perpendicular to a radial axis extending along a direction defining the diameter (d) of the body. It will be appreciated that any other fillers and/or phases (e.g., porosity) of the body can be contained within the bond material 903.

In an embodiment, the body 901 can include a type of porosity selected from the group consisting of closed porosity, open porosity, and a combination thereof. In an aspect, a majority of the porosity can be closed porosity defined by discrete pores, and in a particular aspect, the porosity can consist essentially of closed porosity. In another aspect, the majority of the porosity can be open defining a network of interconnected channels extending through at least a portion of the body, and in a particular aspect, essentially all of the porosity can be open porosity. In still another aspect, the porosity can include a combination of open and closed porosity.

In an embodiment, the body 901 can include a particular porosity that can facilitate improved properties and performance of abrasive articles. In an instance, the body 901 can include at least 1 vol % porosity for a total volume of the body, or at least 2 vol %, or at least 4 vol %, or at least 6 vol %, or at least 8 vol %, or at least 10 vol %, or at least 12 vol %, or at least 14 vol %, or at least 16 vol %, or at least 18 vol %, or at least 20 vol %, or at least 25 vol %, or at least 30 vol %, or at least 40 vol %, or at least 45 vol %, or at least 50 vol %, or at least 55 vol %. In another instance, the body 101 may include not greater than 80 vol % porosity for a total volume of the body or not greater than 75 vol %, or not greater than 70 vol %, or not greater than 65 vol %, or not greater than 60 vol %, or not greater than 55 vol %, or not greater than 50 vol %, or not greater than 45 vol %, or not greater than 40 vol %, or not greater than 35 vol %, or not greater than 30 vol %, or not greater than 25 vol %, or not greater than 20 vol %, or not greater than 15 vol %, or not greater than 10 vol %, or not greater than 5 vol %, or not greater than 2 vol %. Moreover, the body 901 can include a porosity in a range including any of the minimum percentages and maximum percentages noted herein.

In an embodiment, the body 901 can include filler. For example, the body 901 may include not greater than 40 vol % filler for the total volume of the body. In a particular instance, the body 901 can have not greater than 35 vol %, such as not greater than 30 vol %, or not greater than 25 vol %, or not greater than 20 vol %, or not greater than 15 vol %, or not greater than 10 vol %, or not greater than 8 vol %, or not greater than 5 vol %, or not greater than 4 vol %, or even not greater than 3 vol % filler. For at least one embodiment, the body 901 may have no filler. According to one non-limiting embodiment, the body 901 can have at least 0.05 vol % filler for the total volume of the body 901, such as at least 0.5 vol %, or at least 1 vol %, or at least 2 vol %, or at least 3 vol %, or at least 5 vol %, or at least 10 vol %, or at least 15 vol %, or at least 20 vol %, or even at least 30 vol % filler. Moreover, filler within the body 901 can be within a range between any of the minimum and maximum percentages noted above, including for example, but not limited to a content within a range of at least 0.5 vol % and not greater than 30 vol %. The filler may include a material selected from the group consisting of powders, granules, spheres, fibers, and a combination thereof. Moreover, in particular instances, the filler can include an inorganic material, an organic material, fibers, woven materials, non-woven materials, particles, minerals, nuts, shells, oxides, alumina, carbide, nitrides, borides, polymeric materials, naturally occurring materials, and a combination thereof. In a certain embodiment, the filler can include a material such as sand, bubble alumina, chromites, magnesite, dolomites, bubble mullite, borides, titanium dioxide, carbon products (e.g., carbon black, coke or graphite), silicon carbide, wood flour, clay, talc, hexagonal boron nitride, molybdenum disulfide, feldspar, nepheline syenite, glass spheres, glass fibers, $CaF_2$, $KBF_4$, Cryolite ($Na_3AlF_6$), potassium Cryolite ($K_3AlF_6$), pyrites, ZnS, copper sulfide, mineral oil, fluorides, carbonates, calcium carbonate, wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), titanates (e.g., potassium titanate fibers), rock wool, clay, sepiolite, iron sulfide (e.g., $Fe_2S_3$, $FeS_2$, or a combination thereof), potassium fluoroborate ($KBF_4$), zinc borate, borax, boric acid, fine alundum powders, P15A, cork, glass spheres, silica microspheres (Z-light), silver, Saran™ resin, paradichlorobenzene, oxalic acid, alkali halides, organic halides, attapulgite or any combination thereof.

In at least one embodiment, the filler may include a material selected from the group consisting of an antistatic agent, a lubricant, a porosity inducer, coloring agent, and a combination thereof. In particular instances wherein the filler is particulate material, it may be distinct from the abrasive particles, being significantly smaller in average particle size than the abrasive particles.

The body 901 is illustrated in cross section as having a generally rectangular shape, which may be representative of a wheel or disc shape with a central opening 930, such that it is an annulus. It will be appreciated that the abrasive articles of the embodiments herein can have a body that may be in the form of a hone, a cone, a cup, flanged shapes, a cylinder, a wheel, a ring, and a combination thereof.

The body 901 can have a generally circular shape as viewed top down. It will be appreciated, that in three-dimensions the body 901 can have a certain thickness (t) such that the body 201 has a disk-like or a cylindrical shape. As illustrated, the body 901 can have an outer diameter (d) extending through the center of the body 901. The central opening 930 can extend through the entire thickness (t) of the body 901 such that the abrasive article 900 can be mounted on a spindle or other machine for rotation of the abrasive article 900 during operation. According to one embodiment, the body 901 may have a particular relationship between the thickness (t) and the diameter (d), such that an aspect ratio (d:t) of the body is at least 10:1, such as at least 20:1, or at least 30:1, or at least 40:1, or at least 50:1, or at least 60:1, or at least 70:1, or at least 80:1, or at least 90:1, or at least 100:1. Still, in one non-limiting embodiment, the aspect ratio (d:t) may be not greater than 1000:1 or not greater than 500:1. It will be appreciated that the aspect ratio (d:t) can be within a range including any of the minimum and maximum values noted above.

Figure 10:
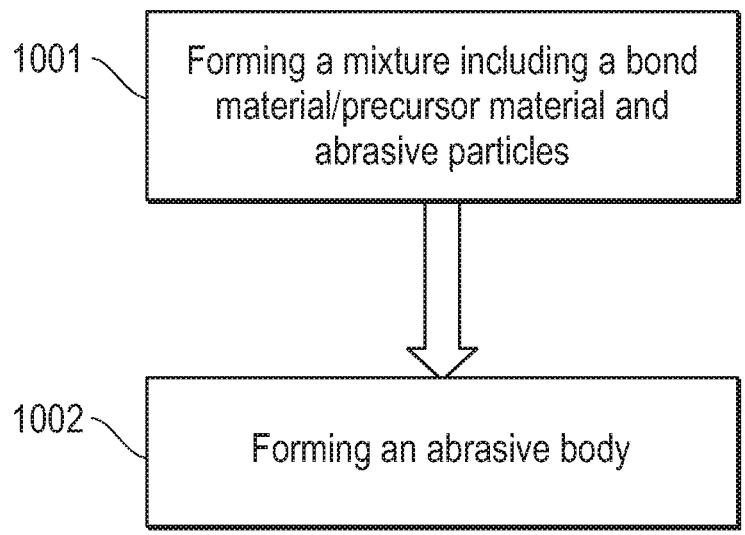
FIG. 10 includes an illustration of a process of forming an abrasive article according to an embodiment.

FIG. 10 includes an illustration of a process of forming an abrasive article including a body. At block 1001, the process can include forming a mixture including a bond material and/or bond precursor material and abrasive particles 210. In an aspect, forming the mixture may include forming abrasive particles 210. In an exemplary implementation, cores 201 may be treated with a first material including silica, such as a dispersion of colloidal silica in a solvent. Wetted cores can be heated at a temperature from 800° C. to 1200° C. for 5 to 60 minutes to allow formation of sintered ceramic material, such as sintered colloidal silica. In a particular implementation, sintering may be conducted at a temperature from 830° C. to 850° C. After forming the first portion 202, coated cores 201 can be further treated with a silane or another silicone-containing compound and dried to form the second portion 203 of the coating 205.

According to one embodiment, the bond material and/or bond precursor material may include a material selected from the group consisting of an organic material, an organic precursor material, an inorganic material, an inorganic precursor material, a natural material, and a combination thereof. In particular instances, the bond material may include a metal or metal alloy, such as a powder metal material, or a precursor to a metal material, suitable for formation of a metal bond matrix material during further processing. According to another embodiment, the mixture may include a vitreous material, or a precursor of a vitreous material, suitable for formation of a vitreous bond material during further processing. For example, the mixture may include a vitreous material in the form of a powder, including for example, an oxygen-containing material, an oxide compound or complex, a frit, and any combination thereof.

In yet another embodiment, the mixture may include a ceramic material, or a precursor of a ceramic material, suitable for formation of a ceramic bond material during further processing. For example, the mixture may include a ceramic material in the form of a powder, including for example, an oxygen-containing material, an oxide compound or complex, and any combination thereof.

According to another embodiment, the mixture may include an organic material, or a precursor of an organic material, suitable for formation of an organic bond material during further processing. Such an organic material may include one or more natural organic materials, synthetic organic materials, and a combination thereof. In particular instances, the organic material can be made of a resin, which may include a thermoset, a thermoplastic, and a combination thereof. For example, some suitable resins can include phenolics, epoxies, polyesters, cyanate esters, shellacs, polyurethanes, polybenzoxazines, polybismaleimides, polyimides, rubber, and a combination thereof. In one particular embodiment, the mixture includes an uncured resin material configured to form a phenolic resin bond material through further processing.

The phenolic resin may be modified with a curing or cross-linking agent, such as hexamethylene tetramine. At temperatures in excess of about 90° C., some examples of the hexamethylene tetramine may form crosslinks to form methylene and dimethylene amino bridges that help cure the resin. The hexamethylene tetramine may be uniformly dispersed within the resin. More particularly, hexamethylene tetramine may be uniformly dispersed within resin regions as a cross-linking agent. Even more particularly, the phenolic resin may contain resin regions with cross-linked domains having a sub-micron average size.

Other materials, such as a filler, can be included in the mixture. The filler may or may not be present in the finally-formed abrasive article. After forming the mixture, the process of forming the abrasive article can further include forming a green body comprising abrasive particles contained in a bond material. A green body is a body that is unfinished and may undergo further processing before a finally-formed abrasive article is formed. Forming of the green body can include techniques such as pressing, molding, casting, printing, spraying, and a combination thereof. In one particular embodiment, forming of the green body can include pressing the mixture into a particular shape, including for example, conducting a pressing operation to form a green body in the form of a grinding wheel.

It will also be appreciated that one or more reinforcing materials may be included within the mixture, or between portions of the mixture to create a composite body including one or more abrasive portions (i.e., abrasive particles contained within the bond material as well as porosity, fillers and the like) and reinforcing portions made up of the reinforcing materials. Some suitable examples of reinforcing materials include woven materials, non-woven materials, fiberglass, fibers, naturally occurring materials, synthetic materials, inorganic materials, organic materials, or any combination thereof. As used herein, terms such as "reinforced" or "reinforcement" refer to discrete layers or portions of a reinforcing material that is different from the bond and abrasive materials employed to make the abrasive portions. Terms such as "internal reinforcement" or "internally reinforced" indicate that these components are within or embedded in the body of the abrasive article. In cut-off wheels the internal reinforcement can be, for example, in the shape of a disc with a middle opening to accommodate the arbor hole of the wheel. In some wheels, the reinforcing materials extend from the arbor hole to the periphery of the body. In others, reinforcing materials can extend from the periphery of the body to a point just under the flanges used to secure the body. Some abrasive articles may be "zone reinforced" with (internal) fiber reinforcement around the arbor hole and flange areas of the body (about 50% of the diameter of the body).

After forming the mixture with the desired components and applying the mixture in the desired processing apparatus, the process can continue by treating the mixture to form a finally-formed abrasive article. Some suitable examples of treating can include curing, heating, sintering, crystallizing, polymerization, pressing, and a combination thereof. In one example, the process may include bond batching, mixing abrasive particles with bond or bond precursor materials, filling a mold, pressing, and heating or curing the mixture.

After finishing the treating process, the abrasive article, such as abrasive article 100, is formed, including abrasive particles and any other additives contained within the bond material.

Figure 11:
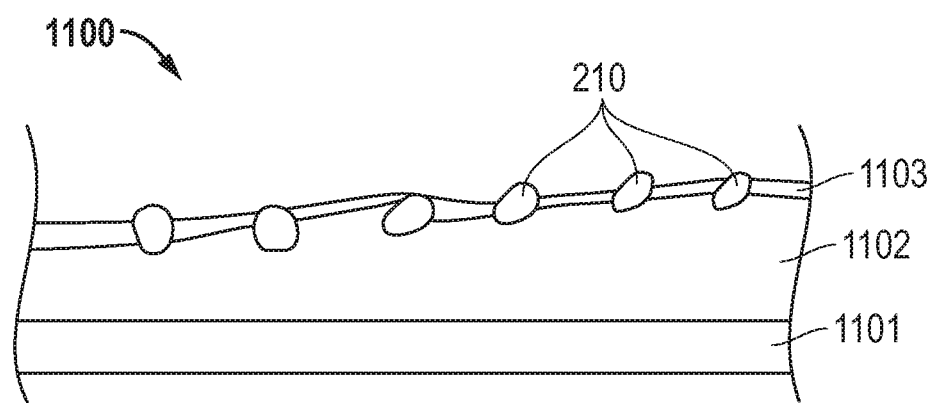
FIG. 11 includes an illustration of a cross section of a coated abrasive article according to an embodiment.
Figures 12A, 12B:
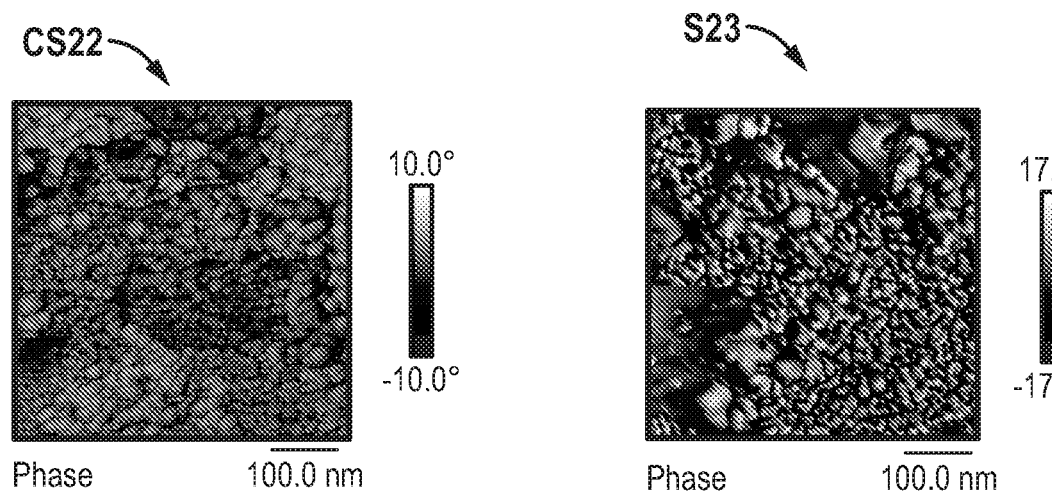
FIGS. 12A to 12D include images of abrasive particles.
Figures 12C, 12D:
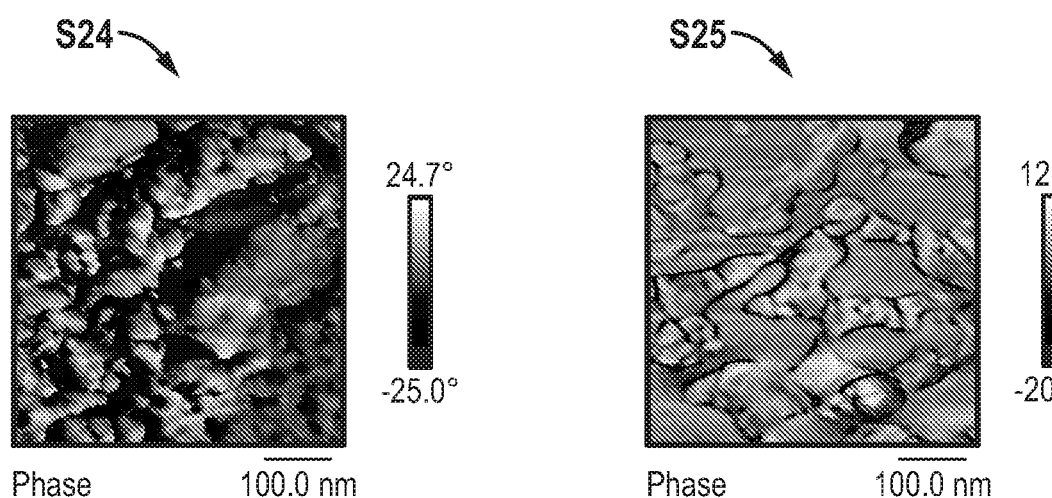

FIG. 11 includes a cross-sectional illustration of a coated abrasive article 1100 including a substrate 1101, a make coat 1102 overlying the substrate 1101, and abrasive particles 210. The coated abrasive article 1100 can optionally include filler, additives, or any combination thereof. A size coat 1103 overlies and bonds to abrasive particles 210 and the make coat 1102.

In an embodiment, the substrate 1101 can include an organic material, inorganic material, and a combination thereof. In certain instances, the substrate 1101 can include a woven material. However, the substrate 1101 may be made of a non-woven material. Particularly suitable substrate materials can include organic materials, including polymers, and particularly, polyester, polyurethane, polypropylene, polyimides such as KAPTON from DuPont, paper or any combination thereof. Some suitable inorganic materials can include metals, metal alloys, and particularly, foils of copper, aluminum, steel, and a combination thereof.

The make coat 1102 can be applied to the surface of the substrate 1101 in a single process, or alternatively, abrasive particles 210 can be combined with a make coat 1102 material and the combination of the make coat 1102 and abrasive particles 210 can be applied as a mixture to the surface of the substrate 1101. In certain instances, controlled deposition or placement of abrasive particles 210 in the make coat 1102 may be better suited by separating the processes of applying the make coat 1102 from the deposition of abrasive particles 210 in the make coat 1102. Still, it is contemplated that such processes may be combined. Suitable materials of the make coat 1102 can include organic materials, particularly polymeric materials, including for example, polyesters, epoxy resins, polyurethanes, polyamides, polyacrylates, polymethacrylates, polyvinylchlorides, polyethylene, polysiloxane, silicones, cellulose acetates, nitrocellulose, natural rubber, starch, shellac, and mixtures thereof. In one embodiment, the make coat 402 can include a polyester resin. The coated substrate can then be heated in order to cure the resin and bond abrasive particles 210 to the substrate 1101. In general, the coated substrate 1101 can be heated to a temperature of between about 100° C. to less than about 250° C. during this curing process.

After sufficiently forming the make coat 1102 with abrasive particles 210 contained therein, the size coat 1103 can be formed to overlie and bond abrasive particles 210 to the make coat 1102 and the substrate 1101. The size coat 1103 can include an organic material, and may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. An abrasive particle, comprising:
a core including a ceramic material;
a coating overlying the core, wherein the coating comprises:
a first portion overlying at least a portion of the core, wherein the first portion comprises sintered colloidal silica; and
a second portion overlying at least a portion of the core, wherein the second portion comprises silane or silane reaction product.

Embodiment 2. An abrasive particle, comprising:
a core including a ceramic material including an average crystallite size of less than 1 micron;
a coating overlying the core, wherein the coating comprises:
a first portion overlying at least a portion of the core, wherein the first portion comprises a sintered ceramic material; and
a second portion overlying at least a portion of the core, wherein the second portion comprises silane or silane reaction product.

Embodiment 3. A plurality of abrasive particles, wherein each of abrasive particles of the plurality of abrasive particles comprises:
a core comprising a ceramic material including a first element forming a cation of the ceramic material and an average crystallite size of less than 1 micron;
a coating overlying at least a portion of the core, wherein the coating comprises silicon; and
an average Silicon/Cation Energy Dispersive Spectroscopy Percentage of at least 0.87%.

Embodiment 4. A plurality of abrasive particles, wherein each of abrasive particles of the plurality of abrasive particles comprises:
a core comprising a ceramic material having an average crystallite size of less than 1 micron; and
a coating overlying at least a portion of the core, wherein the coating comprises silicon; and
an average Silicon Energy Dispersive Spectroscopy value of at least 0.39.

Embodiment 5. The abrasive particle or a plurality of abrasive particles of any one of embodiments 1 to 4, wherein the core comprises polycrystalline alpha-alumina comprising an average crystallite size of less than 1 micron.

Embodiment 6. The abrasive particle or a plurality of abrasive particles of any one of embodiments 1 to 5, wherein the core consists essentially of polycrystalline alpha-alumina including an average crystallite size of less than 1 micron.

Embodiment 7. The abrasive particle or a plurality of abrasive particles of embodiment 5 or 6, wherein the polycrystalline alpha-alumina comprising an average crystallite size of at least 0.01 microns, at least 0.02 microns, at least 0.03 microns, at least 0.04 microns, at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16, at least 0.17 microns, at least 0.18 microns, at least 0.19 microns, at least 0.2 microns, at least 0.3 microns, or at least 0.4 microns, or at least 0.5 microns.

Embodiment 8. The abrasive particle or a plurality of abrasive particles of any one of embodiments 5 to 7, wherein the polycrystalline alpha-alumina comprises an average crystallite size of not greater than 0.9 microns, not greater than 0.8 microns, not greater than 0.7 microns, not greater than 0.6 microns, not greater than 0.5 microns, not greater than 0.4 microns, not greater than 0.3 microns, not greater than 0.2 microns, not greater than 0.1 microns, not greater than 0.09 microns, not greater than 0.08 microns, not greater than 0.07 microns, not greater than 0.06 microns, not greater than 0.05 microns, not greater than 0.04 microns, not greater than 0.03 microns, not greater than 0.02 microns, or not greater than 0.01 microns.

Embodiment 9. The abrasive particle or a plurality of abrasive particles of any one of embodiments 5 to 8, wherein the polycrystalline alpha-alumina comprises an average crystallite size in a range including at least 0.01 microns and less than 1 micron, in a range including at least 0.03 microns and not greater than 0.8 microns, in a range including at least 0.05 microns and not greater than 0.6 microns, in a range including at least 0.08 microns and not greater than 0.4 microns, or in a range including at least 0.1 microns and not greater than 0.2 microns.

Embodiment 10. The abrasive particle or a plurality of abrasive particles of any one of embodiments 1 to 4, wherein the core comprises a sintered ceramic material including an oxide, a carbide, a nitride, a boride, an oxycarbide, an oxynitride, superabrasives, carbon-based materials, agglomerates, aggregates, shaped abrasive particles, microcrystalline materials, nanocrystalline materials, or any combination thereof.

Embodiment 11. The abrasive particle or a plurality of abrasive particles of any one of embodiments 1 to 10, wherein the core comprises a density of at least 2.10 g/cm$^3$, at least 2.20 g/cm$^3$, 2.30 g/cm$^3$, at least 2.40 g/cm$^3$, at least 2.50 g/cm$^3$, at least 2.60 g/cm$^3$, at least 2.70 g/cm$^3$, 2.80 g/cm$^3$, at least 2.90 g/cm$^3$, at least 3.00 g/cm$^3$, at least 3.10 g/cm$^3$, at least 3.20 g/cm$^3$, at least 3.30 g/cm$^3$, at least 3.40 g/cm$^3$, 3.50 g/cm$^3$, at least 3.55 g/cm$^3$, at least 3.60 g/cm$^3$, at least 3.65 g/cm$^3$, at least 3.70 g/cm$^3$, at least 3.75 g/cm$^3$, at least 3.80 g/cm$^3$, at least 3.85 g/cm$^3$, at least 3.90 g/cm$^3$, or at least 3.95 g/cm$^3$.

Embodiment 12. The abrasive particle or a plurality of abrasive particles of any one of embodiments 1 to 10, wherein the core comprises a density of not greater than 5.80 g/cm$^3$, not greater than 5.70 g/cm$^3$, not greater than 5.60 g/cm$^3$, not greater than 5.50 g/cm$^3$, not greater than 5.40 g/cm$^3$, not greater than 5.30 g/cm$^3$, not greater than 5.20 g/cm$^3$, not greater than 5.10 g/cm$^3$, not greater than 5.00 g/cm$^3$, not greater than 4.90 g/cm$^3$, not greater than 4.80 g/cm$^3$, not greater than 4.70 g/cm$^3$, not greater than 4.60 g/cm$^3$, not greater than 4.50 g/cm$^3$, not greater than 4.40 g/cm$^3$, not greater than 4.30 g/cm$^3$, not greater than 4.20 g/cm$^3$, not greater than 4.10 g/cm$^3$, not greater than 4.00 g/cm$^3$, or not greater than 3.97 g/cm$^3$.

Embodiment 13. The abrasive particle or a plurality of abrasive particles of any one of embodiments 1 to 12, wherein the core comprises a density of at least 80% of its theoretical density, at least 85%, at least 88%, at least 90%, at least 92%, at least 95%, or at least 98% of its theoretical density.

Embodiment 14. The abrasive particle or a plurality of abrasive particles of any one of embodiments 1 to 13, wherein the core comprises a porosity not greater than 10 vol % for a total volume of the core, not greater than 9 vol %, not greater than 8 vol %, not greater than 7 vol %, not greater than 6 vol %, not greater than 5 vol %, not greater than 4 vol %, not greater than 3 vol %, not greater than 2 vol %, or not greater than 1 vol % for the total volume of the core.

Embodiment 15. The abrasive particle or a plurality of abrasive particles of any one of embodiments 1 to 14, wherein the core is essentially free of pores.

Embodiment 16. The abrasive particle or a plurality of abrasive particles of any one of embodiments 1 to 15, wherein the abrasive particle comprises an average Silicon Energy Dispersive Spectroscopy value of at least 0.39, at least 0.41, at least 0.43, at least 0.45, at least 0.47, at least 0.48, at least 0.49, at least 0.50, at least 0.51, at least 0.52, at least 0.54, at least 0.55, at least 0.56, at least 0.57, at least 0.59, at least 0.60, at least 0.61, at least 0.62, at least 0.64, at least 0.66, at least 0.67, at least 0.69, at least 0.70, at least 0.72, at least 0.74, at least 0.75, at least 0.77, at least 0.78, at least 0.79, at least 0.81, at least 0.83, at least 0.85, at least 0.87, at least 0.89, at least 0.90, at least 0.92, at least 0.93, at least 0.94, at least 0.95, at least 0.96, at least 0.97, at least 0.99, at least 1.00, at least 1.10, at least 1.15, at least 1.20, at least 1.25, at least 1.30, at least 1.35, at least 1.40, at least 1.45, at least 1.50, at least 1.55, at least 1.60, at least 1.65, at least 1.70, at least 1.75, at least 1.80, at least 1.85, at least 1.90, at least 1.95, at least 2.00, at least 2.10, at least 2.15, at least 2.20, at least 2.25, at least 2.30, at least 2.35, at least 2.40, at least 2.45, at least 2.50, at least 2.55, at least 2.60, at least 2.65, at least 2.70, at least 2.75, at least 2.80, at least 2.85, at least 2.90, at least 2.95, or at least 3.00.

Embodiment 17. The abrasive particle or a plurality of abrasive particles of any one of embodiments 1 to 16, wherein the abrasive particle comprises an average Silicon Energy Dispersive Spectroscopy value of not greater than 6.00, not greater than 5.95, not greater than 5.90, not greater than 5.85, not greater than 5.80, not greater than 5.75, not greater than 5.60, not greater than 5.50, not greater than 5.45, not greater than 5.35, not greater than 5.20, not greater than 5.10, not greater than 5.00, not greater than 4.95, not greater than 4.90, not greater than 4.85, not greater than 4.80, not greater than 4.75, not greater than 4.60, not greater than 4.50, not greater than 4.45, not greater than 4.35, not greater than 4.20, not greater than 4.10, not greater than 4.00, not greater than 3.95, not greater than 3.90, not greater than 3.85, not greater than 3.80, not greater than 3.75, not greater than 3.60, not greater than 3.50, not greater than 3.45, not greater than 3.35, not greater than 3.20, or not greater than 3.10.

Embodiment 18. The abrasive particle or a plurality of abrasive particles of any one of embodiments 1 to 17, wherein the core comprises a ceramic material including a first element forming a cation of the ceramic material, and wherein the abrasive particle comprises an average Silicon/Cation Energy Dispersive Spectroscopy Percentage of at least 0.9%, at least 1.0%, at least 1.2%, at least 1.5%, at least 1.7%, at least 1.9%, at least 2.0%, at least 2.1%, at least 2.2%, at least 2.4%, at least 2.7%, at least 2.9%, at least 3.0%, at least 3.1%, at least 3.3%, at least 3.5%, at least 3.7%, at least 3.9%, at least 4.1%, at least 4.3%, at least 4.5%, at least 4.7%, at least 4.9%, at least 5.0%, at least 5.1%, at least 5.2%, at least 5.4%, at least 5.6%, at least 5.8%, at least 6.0%, at least 6.1%, at least 6.3%, at least 6.5%, at least 6.7%, at least 6.9%, at least 7.0%, or at least 7.1%.

Embodiment 19. The abrasive particle or a plurality of abrasive particles of any one of embodiments 1 to 18, wherein the core comprises a ceramic material including a first element forming a cation of the ceramic material, and wherein the abrasive particle comprises an average Silicon/ Cation Energy Dispersive Spectroscopy Percentage of not greater than 10.0%, not greater than 9.9%, not greater than 9.7%, not greater than 9.5%, not greater than 9.3%, not greater than 9.1%, not greater than 9.0%, not greater than 8.9%, not greater than 8.7%, not greater than 8.5%, not greater than 8.4%, not greater than 8.3%, not greater than 8.1%, not greater than 8.0%, not greater than 7.9%, not greater than 7.8%, not greater than 7.6%, not greater than 7.5%, not greater than 7.4%, not greater than 7.3%, or not greater than 7.2%.

Embodiment 20. The abrasive particle or a plurality of abrasive particles of any one of embodiments 3, 18, and 19, wherein the first element forming a cation of the ceramic material comprises aluminum, zirconium, magnesium, or a combination thereof.

Embodiment 21. The abrasive particle or a plurality of abrasive particles of any one of embodiments 3 and 18 to 20, wherein the first element forming a cation of the ceramic material consists of aluminum.

Embodiment 22. The abrasive particle or a plurality of abrasive particles of any one of embodiments 1 to 21, wherein the abrasive particle comprises an average Energy Dispersive Spectroscopy value of an element selected from the group consisting of alkali metal and alkaline earth metal of not greater than 2.0, not greater than 1.9, not greater than 1.8, not greater than 1.7, not greater than 1.6, not greater than 1.5, not greater than 1.4, not greater than 1.3, not greater than 1.2, not greater than 1.1, not greater than 1.0, not greater than 0.9, not greater than 0.8, not greater than 0.7, or not greater than 0.6.

Embodiment 23. The abrasive particle or a plurality of abrasive particles of any one of embodiments 1 to 22, wherein the abrasive particle comprises a sodium average Energy Dispersive Spectroscopy value of not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01.

Embodiment 24. The abrasive particle or a plurality of abrasive particles of any one of embodiments 1 to 23, wherein the abrasive particle comprises a potassium average Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01.

Embodiment 25. The abrasive particle or a plurality of abrasive particles of any one of embodiments 1 to 24, wherein the abrasive particle comprises a calcium average Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01.

Embodiment 26. The abrasive particle or a plurality of abrasive particles of any one of embodiments 1 to 25, wherein the abrasive particle comprises a magnesium average Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01.

Embodiment 27. The abrasive particle or a plurality of abrasive particles of any one of embodiments 1 to 26, wherein the abrasive particle comprises a barium average Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01.

Embodiment 28. The abrasive particle or a plurality of abrasive particles of any one of embodiments 1 to 27, wherein the abrasive particle comprises a boron Energy Dispersive Spectroscopy value of not greater than not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01.

Embodiment 29. The abrasive particle or a plurality of abrasive particles of any one of embodiments 1 to 28, wherein the abrasive particle comprises a Silicon/Boron Energy Dispersive Spectroscopy ratio of at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100.

Embodiment 30. The abrasive particle or a plurality of abrasive particles of any one of embodiments 1 to 29, wherein the abrasive particle comprises a Silicon/Sodium Energy Dispersive Spectroscopy ratio of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100.

Embodiment 31. The abrasive particle or a plurality of abrasive particles of any one of embodiments 1 to 30, wherein the abrasive particle comprises a Silicon/Barium Energy Dispersive Spectroscopy ratio of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100.

Embodiment 32. The abrasive particle or a plurality of abrasive particles of any one of embodiments 1 to 31, wherein the abrasive particle comprises a Silicon/Potassium Energy Dispersive Spectroscopy ratio of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100.

Embodiment 33. The abrasive particle or a plurality of abrasive particles of any one of embodiments 1 to 32, wherein the abrasive particle comprises a Silicon/Calcium Energy Dispersive Spectroscopy ratio of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 31, at least 32, at least 34, at least 35, at least 36, at least 37, at least 38, at least 39, at least 40, at least 45, at least 50, at least 55, at least 60, or at least 100.

Embodiment 34. The abrasive particle or a plurality of abrasive particles of any one of embodiments 1 to 33, wherein the abrasive particle comprises an average Energy Dispersive Spectroscopy value of an element selected from transition metal of not greater than 1, not greater than 0.9, not greater than 0.8, not greater than 0.7, not greater than 0.6, not greater than 0.5, not greater than 0.4, not greater than 0.3, not greater than 0.2, not greater than 0.1, not greater than 0.09, not greater than 0.08, not greater than 0.07, not greater than 0.06, not greater than 0.05, not greater than 0.04, not greater than 0.03, not greater than 0.02, or not greater than 0.01.

Embodiment 35. The abrasive particle or a plurality of abrasive particles of any one of embodiments 1 to 34, wherein the coating is essentially free of an element selected from alkali and alkaline earth metal.

Embodiment 36. The abrasive particle or a plurality of abrasive particles of any one of embodiments 1 to 35, wherein the coating is essentially free of an element selected from transitional metal.

Embodiment 37. The abrasive particle or a plurality of abrasive particles of any one of embodiments 1 to 36, wherein the coating is essentially free of boron, aluminum, or both.

Embodiment 38. The plurality of abrasive particles of embodiment 3 or 4, wherein the coating comprises:
  a first portion overlying at least a portion of the core, wherein the first portion comprises a sintered ceramic material including the silicon; and
  a second portion overlying at least a portion of the core, wherein the second portion comprises silane.

Embodiment 39. The plurality of abrasive particles of embodiment 38, wherein the coating comprises a sintered colloidal silica.

Embodiment 40. The abrasive particle or a plurality of abrasive particles of any one of embodiments 1 and 39, wherein the second portion overlies at least a portion of the first portion.

Embodiment 41. The abrasive particle or a plurality of abrasive particles of any one of embodiments 1 to 40, wherein the abrasive particle comprises a content of the coating of at least 0.01 wt. % for a total weight of the core, at least 0.02 wt. %, at least 0.03 wt. %, at least 0.04 wt. %, at least 0.05 wt. %, at least 0.06 wt. %, at least 0.07 wt. %, at least 0.08 wt. %, at least 0.09 wt. %, at least 0.1 wt. %, at least 0.15 wt. %, at least 0.16 wt. %, at least 0.17 wt. %, at least 0.18 wt. %, at least 0.19 wt. %, at least 0.2 wt. %, at least 0.25 wt. %, at least 0.26 wt. %, at least 0.27 wt. %, at least 0.28 wt. %, at least 0.29 wt. %, or at least 0.3 wt. % for a total weight of the core.

Embodiment 42. The abrasive particle or a plurality of abrasive particles of any one of embodiments 1 to 41, wherein the abrasive particle comprises a content of the coating of not greater than 1 wt. % for a total weight of the core, not greater than 0.9 wt. %, not greater than 0.8 wt. %, not greater than 0.7 wt. %, not greater than 0.6 wt. %, not greater than 0.55 wt. %, not greater than 0.5 wt. %, not greater than 0.48 wt. %, not greater than 0.46 wt. %, not greater than 0.45 wt. %, not greater than 0.43 wt. %, not greater than 0.42 wt. %, not greater than 0.41 wt. %, not greater than 0.4 wt. %, not greater than 0.38 wt. %, not greater than 0.37 wt. %, not greater than 0.36 wt. %, not greater than 0.35 wt. %, or not greater than 0.34 wt. % for a total weight of the core.

Embodiment 43. The abrasive particle or a plurality of abrasive particles of any one of embodiments 1 to 42, wherein the coating comprises a thickness of not greater than 10 microns, not greater than 9 microns, not greater than 8 microns, not greater than 7 microns, not greater than 6 microns, not greater than 5 microns, not greater than 4 microns, not greater than 3 microns, not greater than 2 microns, not greater than 1 microns, not greater than 0.9 microns, not greater than 0.8 microns, not greater than 0.7 microns, not greater than 0.6 microns, not greater than 0.5 microns, not greater than 0.4 microns, not greater than 0.3 microns, or not greater than 0.2 microns.

Embodiment 44. The abrasive particle or a plurality of abrasive particles of any one of embodiments 1 to 43, wherein the coating comprises a thickness of at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16 microns, at least 0.17 microns, at least 0.18 microns, at least 0.19 microns, at least 0.20 microns, at least 0.21 microns, at least 0.22 microns, at least 0.24 microns, at least 0.26 microns, at least 0.28 microns, at least 0.29 microns, at least 0.30 microns, or at least 0.31 microns.

Embodiment 45. The abrasive particle or a plurality of abrasive particles of any one of embodiments 1 to 44, wherein the abrasive particle comprises a ratio of a thickness of the coating to an average particle size of the core, wherein the ratio is less than 1, not greater than 0.9, not greater than 0.7, not greater than 0.5, not greater than 0.4, not greater than 0.2, not greater than 0.1, not greater than 0.08, not greater than 0.06, not greater than 0.05, not greater than 0.03, not greater than 0.02, not greater than 0.01, not greater than 0.009, not greater than 0.008, not greater than 0.007, not greater than 0.006, not greater than 0.005, not greater than 0.004, not greater than 0.003, not greater than 0.002, or not greater than 0.1.

Embodiment 46. The abrasive particle or a plurality of abrasive particles of any one of embodiments 1 to 45, wherein the abrasive particle comprises a ratio of a thickness of the coating to an average particle size of the core, wherein the ratio is at least 0.0005, at least 0.0007, at least 0.0009, at least 0.001, at least 0.002, at least 0.003, at least 0.004, at least 0.005, at least 0.006, at least 0.007, at least 0.008, at least 0.009, at least 0.01, at least 0.02, or at least 0.03.

Embodiment 47. The abrasive particle or a plurality of abrasive particles of any one of embodiments 1 to 46, wherein the coating comprises a polycrystalline material.

Embodiment 48. The abrasive particle or a plurality of abrasive particles of any one of embodiments 1 to 47, wherein a majority of the coating is polycrystalline.

Embodiment 49. The abrasive particle or a plurality of abrasive particles of any one of embodiments 1 to 48, wherein for a total volume of the coating, at least 51 vol % of the coating is polycrystalline, at least 52 vol %, at least 53 vol %, at least 54 vol %, at least 55 vol %, at least 56 vol %, at least 57 vol %, at least 58 vol %, at least 59 vol %, at least 60 vol %, at least 61 vol %, at least 62 vol %, at least 63 vol %, at least 64 vol %, at least 65 vol %, at least 66 vol %, at least 67 vol %, at least 68 vol %, at least 69 vol %, at least 70 vol %, at least 71 vol %, at least 72 vol %, at least 73 vol %, at least 74 vol %, at least 75 vol %, at least 76 vol %, at least 77 vol %, at least 78 vol %, at least 79 vol %, at least 80 vol %, at least 81 vol %, at least 82 vol %, at least 83 vol %, at least 84 vol %, at least 85 vol %, at least 86 vol %, at least 87 vol %, at least 88 vol %, at least 89 vol %, at least 90 vol %, at least 91 vol %, at least 92 vol %, at least 93 vol %, at least 94 vol %, at least 95 vol %, at least 96 vol %, at least 97 vol %, at least 98 vol %, or at least 99 vol % of the coating is polycrystalline.

Embodiment 50. The abrasive particle or a plurality of abrasive particles of any one of embodiments 1 to 49, wherein the coating consists essentially of a polycrystalline material.

Embodiment 51. The abrasive particle or a plurality of abrasive particles of any one of embodiments 1 to 50, wherein the coating is essentially free of an amorphous phase.

Embodiment 52. The abrasive particle or a plurality of abrasive particles of any one of embodiments 1 to 51, wherein a majority of the coating is silica.

Embodiment 53. The abrasive particle or a plurality of abrasive particles of any one of embodiments 1 to 52, wherein for a total weight of the coating, at least 51 wt. % of the coating is silica, at least 52 wt. %, at least 53 wt. %, at least 54 wt. %, at least 55 wt. %, at least 56 wt. %, at least 57 wt. %, at least 58 wt. %, at least 59 wt. %, at least 60 wt. %, at least 61 wt. %, at least 62 wt. %, at least 63 wt. %, at least 64 wt. %, at least 65 wt. %, at least 66 wt. %, at least 67 wt. %, at least 68 wt. %, at least 69 wt. %, at least 70 wt. %, at least 71 wt. %, at least 72 wt. %, at least 73 wt. %, at least 74 wt. %, at least 75 wt. %, at least 76 wt. %, at least 77 wt. %, at least 78 wt. %, at least 79 wt. %, at least 80 wt. %, at least 81 wt. %, at least 82 wt. %, at least 83 wt. %, at least 84 wt. %, at least 85 wt. %, at least 86 wt. %, at least 87 wt. %, at least 88 wt. %, at least 89 wt. %, at least 90 wt. %, at least 91 wt. %, at least 92 wt. %, at least 93 wt. %, at least 94 wt. %, or at least 95 wt. % of the coating is silica.

Embodiment 54. The abrasive particle or a plurality of abrasive particles of any one of embodiments 1 to 53, wherein the coating consists essentially of silica.

Embodiment 55. The abrasive particle or a plurality of abrasive particles of any one of embodiments 1 to 54, wherein the coating comprises silica grains having an average crystallite size of at least 0.01 microns, at least, at least 0.02 microns, at least 0.03 microns, at least 0.04 microns, at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16, at least 0.17 microns, at least 0.18 microns, at least 0.19 microns, at least 0.2 microns, at least 0.3 microns, at least 0.4 microns, at least 0.5 microns, at least 0.6 microns, at least 0.7 microns, at least 0.8 microns, at least 0.9 microns, at least 1 micron, at least 1.2 microns, at least 1.4 microns, at least 1.6 microns, at least 1.8 microns, at least 2 microns, at least 2.3 microns, at least 2.6 microns, at least 2.8 microns, at least 3 microns, at least 3.2 microns, at least 3.4 microns, at least 3.6 microns, at least 3.8 microns, at least 4 microns, at least 4.2 microns, at least 4.5 microns, at least 4.8, at least 5 microns, at least 5.2 microns, at least 5.4microns, at least 5.5 microns, at least 5.7 microns, at least 6 microns, at least 6.2 microns, at least 6.3 microns, at least 6.5 microns, at least 6.7 microns, at least 6.8 microns, at least 7 microns, at least 7.2, at least 7.4 microns, at least 7.5 microns, at least 7.8 microns, at least 8 microns, at least 8.1 microns, at least 8.3 microns, at least 8.5 microns, at least 8.6 microns, at least 8.7 microns, at least 8.9 microns, at least 9, at least 9.1 microns, at least 9.3 microns, at least 9.4 microns, at least 9.6 microns, at least 9.8 microns, or at least 10 microns.

Embodiment 56. The abrasive particle or a plurality of abrasive particles of any one of embodiments 1 to 55, wherein the coating comprises silica grains having an average crystallite size of not greater than 10 microns, not greater than 9.8 microns, not greater than 9.6 microns, not greater than 9.4 microns, not greater than 9.2 microns, not greater than 9 microns, not greater than 8.7 microns, not greater than 8.5 microns, not greater than 8.3 microns, not greater than 8.1 microns, not greater than 8 microns, not greater than 7.8 microns, not greater than 7.6 microns, not greater than 7.4 microns, not greater than 7.2 microns, not greater than 7 microns, not greater than 6.8 microns, not greater than 6.6 microns, not greater than 6.4 microns, not greater than 6.3 microns, not greater than 6.2 microns, not greater than 6 microns, not greater than 5.8 microns, not greater than 5.6 microns, not greater than 5.4 microns, not greater than 5.3 microns, not greater than 5 microns, not greater than 4.8 microns, not greater than 4.6 microns, not greater than 4.4 microns, not greater than 4.2 microns, not greater than 4 microns, not greater than 3.8 microns, not greater than 3.6 microns, not greater than 3.4 microns, not greater than 3.2 microns, not greater than 2.9 microns, not greater than 2.8 microns, not greater than 2.6 microns, not greater than 2.4 microns, not greater than 2.2 microns, not greater than 2 microns, not greater than 1.8 microns, not greater than 1.6 microns, not greater than 1.4 microns, not greater than 1.2 microns, not greater than 1 microns, not greater than 0.9 microns, not greater than 0.8 microns, not greater than 0.7 microns, not greater than 0.6 microns, not greater than 0.5 microns, not greater than 0.4 microns, not greater than 0.3 microns, not greater than 0.2 microns, not greater than 0.1 microns, not greater than 0.09 microns, not greater than 0.08 microns, not greater than 0.07 microns, not greater than 0.06 microns, not greater than 0.05 microns, not greater than 0.04 microns, not greater than 0.03 microns, not greater than 0.02 microns, or not greater than 0.01 microns.

Embodiment 57. The abrasive particle or a plurality of abrasive particles of any one of embodiments 1 to 56, wherein the majority of the coating consists essentially of silica grains.

Embodiment 58. The abrasive particle or a plurality of abrasive particles of any one of embodiments 1 to 57, wherein the coating consists essentially of silica grains.

Embodiment 59. The abrasive particle or a plurality of abrasive particles of any one of embodiments 1 to 58, wherein the abrasive particle comprises an average particle size of at least 10 microns, at least 30 microns, at least 40 microns, at least 50 microns, at least 60 microns, at least 70 microns, at least 80 microns, at least 90 microns, at least 100 microns, at least 120 microns, at least 140 microns, at least 150 microns, at least 170 microns, at least 180 microns, at least 200 microns, at least 210 microns, at least 230 microns, at least 250 microns, at least 260 microns, at least 270 microns, at least 290 microns, at least 300 microns, at least 320 microns, at least 340 microns, at least 350 microns, at least 360 microns, at least 380 microns, at least 400 microns, at least 420 microns, at least 430 microns, at least 440 microns, at least 450 microns, at least 460 microns, at least 470 microns, at least 490 microns, or at least 500 microns.

Embodiment 60. The abrasive particle or a plurality of abrasive particles of any one of embodiments 1 to 59, wherein the abrasive particle comprises an average particle size of not greater than 2000 microns, not greater than 1800 microns, not greater than 1600 microns, not greater than 1500 microns, not greater than 1400 microns, not greater than 1300 microns, not greater than 1200 microns, not greater than 1100 microns, not greater than 1000 microns, not greater than 900 microns, not greater than 850 microns, not greater than 830 microns, not greater than 800 microns, not greater than 750 microns, not greater than 700 microns, not greater than 650 microns, not greater than 600 microns, not greater than 550 microns, not greater than 500 microns, not greater than 450 microns, or not greater than 400 microns.

Embodiment 61. The abrasive particle or a plurality of abrasive particles of any one of embodiments 1 to 60, wherein the coating comprises silane, wherein the silane is in form of an organic-inorganic compound.

Embodiment 62. The abrasive particle or a plurality of abrasive particles of embodiment 61, wherein the compound comprises organosilicon.

Embodiment 63. The abrasive particle or a plurality of abrasive particles of embodiment 61 or 62, wherein the compound comprises aminosilane, bis-aminosilane, gamma-aminopropyltriethoxysilane, or any combination thereof.

Embodiment 64. The abrasive particle or a plurality of abrasive particles of any one of embodiments 1 to 63, wherein the first portion comprises an average domain size of at least 10 nm, at least 12 nm, at least 15 nm, at least 18 nm, at least 20 nm, at least 22 nm, at least 25 nm, or at least 28 nm.

Embodiment 65. The abrasive particle or a plurality of abrasive particles of any one of embodiments 1 to 64, wherein the first portion comprises an average domain size can be at most 130 nm, at most 120 nm, at most 100 nm, at most 90 nm, at most 85 nm, at most 83 nm, at most 80 nm, at most 78 nm, at most 75 nm, at most 72 nm, at most 70 nm, at most 68 nm, at most 65 nm, at most 62 nm, at most 60 nm, at most 58 nm, at most 55 nm, at most 52 nm, or at most 50 nm.

Embodiment 66. The abrasive particle or a plurality of abrasive particles of any one of embodiments 1 to 65, wherein the first portion comprises an average root-mean-square roughness (Rq) of less than 6 nm, at most 5.5 nm, or at most 5 nm.

Embodiment 67. The abrasive particle or a plurality of abrasive particles of any one of embodiments 1 to 66, wherein the first portion comprises an average root-mean-square roughness (Rq) of greater than 1 nm, at least 1.5 nm, at least 2 nm, at least 2.5 nm, at least 2.8 nm, or at least 3 nm.

Embodiment 68. A fixed abrasive article, comprising:
a body including:
a bond material comprising an organic material;
abrasive particles contained in the bond material, wherein the abrasive particles comprise the abrasive particle or a plurality of abrasive particles of any one of claims 1 to 67.

Embodiment 69. An abrasive particle, comprising:
a core including a ceramic material;
a coating overlying the core, wherein the coating comprises:
a first portion overlying at least a portion of the core, wherein the first portion comprises sintered colloidal silica and a surface roughness of not greater than 5 nm and a crystalline content of not greater than 60%; and
a second portion overlying at least a portion of the core, wherein the second portion comprises silane or silane reaction product.

Embodiment 70. An abrasive particle, comprising:
a core including a ceramic material including an average crystallite size of less than 1 micron;
a coating overlying the core, wherein the coating comprises:
a first portion overlying at least a portion of the core, wherein the first portion comprises a sintered ceramic material and a surface roughness of not greater than 5 nm and a crystalline content of not greater than 60%; and
a second portion overlying at least a portion of the core, wherein the second portion comprises silane or silane reaction product.

Embodiment 71. A plurality of abrasive particles, comprising a plurality of the abrasive particles of embodiment 69 or 70.

Embodiment 72. The plurality of abrasive particles of embodiment 71, wherein:
the core comprises a ceramic material including a first element forming a cation of the ceramic material; and
the plurality of abrasive particles comprise:
an average Silicon/Cation Energy Dispersive Spectroscopy Percentage of at least 0.87%;
an average Silicon Energy Dispersive Spectroscopy value of at least 0.39; or
a combination thereof.

Embodiment 73. The plurality of abrasive particles of embodiment 71, wherein the core comprises polycrystalline alpha-alumina comprising an average crystallite size of less than 1 micron.

Embodiment 74. The plurality of abrasive particles of embodiment 72, wherein the average Silicon Energy Dispersive Spectroscopy value is not greater than 6.00.

Embodiment 75. The plurality of abrasive particles of embodiment 72, wherein the average Silicon/Cation Energy Dispersive Spectroscopy Percentage is not greater than 10.0%.

Embodiment 76. The plurality of abrasive particles of embodiment 72, wherein the first element forming a cation of the ceramic material comprises aluminum, zirconium, magnesium, or a combination thereof.

Embodiment 77. The plurality of abrasive particles of embodiment 71, wherein the abrasive particle comprises a content of the coating of at least 0.01 wt. % and not greater than 1 wt. % for a total weight of the core.

Embodiment 78. The plurality of abrasive particles of embodiment 71, wherein the coating comprises a thickness of at least 0.05 microns and not greater than 10 microns.

Embodiment 79. The plurality of abrasive particles of embodiment 71, wherein the coating comprises a polycrystalline material including silica.

Embodiment 80. The plurality of abrasive particles of embodiment 71, wherein the coating further comprises an amorphous phase including silica.

Embodiment 81. The plurality of abrasive particles of embodiment 71, wherein the roughness is at least 3 nm.

Embodiment 82. The plurality of abrasive particles of embodiment 71, wherein the crystallinity is at least 3%.

Embodiment 83. An abrasive article, comprising a body including a bond material and the plurality of abrasive particles of embodiment 71 contained in the bond material.

EXAMPLES

Example 1

HiPal® alumina particles were mixed with Ludox® colloidal silica at a silica content of 0.1 wt. % for a total weight of the alumina particles for 3 to 5 minutes. A portion of the wetted particles were sintered at 850° C. for 15 minutes to form coated particle Sample S3. Another portion of the wetted particles were dried at 250° C. to form Sample CS2. Untreated particles are referred to as Sample CS1. All the samples were analyzed using Energy Dispersive Spectroscopy. The readout of represent of each Sample is included in FIGS. 3A to 3C, respectively. As illustrated, Sample S3 demonstrated a distinct and higher Silicon peak compared to Samples CS1 and CS2.

Average Energy Dispersive Spectroscopy Values of some elements based on tests on at least 5 abrasive particles are included in Table 1 below.

TABLE 1

|     |                    | C    | O     | Mg   | Al    | Si   | Pt   |
|-----|--------------------|------|-------|------|-------|------|------|
| CS1 | Mean value:        | 4.16 | 48.79 | 0.76 | 46.29 | 0.00 | 0.00 |
|     | Standard deviation | 0.93 | 0.69  | 0.13 | 0.42  | 0.00 | 0.00 |
| S3  | Mean value:        | 5.52 | 48.48 | 0.71 | 42.26 | 3.03 | 0.00 |
|     | Standard deviation | 4.42 | 1.77  | 0.13 | 4.92  | 1.61 | 0.00 |
| CS2 | Mean value:        | 4.72 | 48.65 | 0.65 | 45.59 | 0.39 | 0.00 |
|     | Standard deviation | 2.84 | 2.56  | 0.04 | 3.14  | 0.26 | 0.00 |

Samples CS1, S3, and CS2 were further analyzed using atomic force microscope. FIG. 8A includes an image of Sample CS1. FIG. 8B includes an image of the coating portion of Sample CS2, and FIG. 8C includes an image of the coating portion of Sample S3. Sample CS2 has an average domain size smaller than the average domain size of Sample S3.

Table 2 includes root-mean-square roughness of the samples.

TABLE 2

| Samples | Rq Roughness (nm) |
|---------|-------------------|
| CS1     | 8.3               |
| CS2     | 11.9              |
| S3      | 4.6               |

Example 2

HiPal® Alumina particles were mixed with a colloidal silica suspension at a silica content of 0.1 wt. % for a total weight of the alumina particles. The wetted grains were heated to 850° C. at a 30 minutes ramp from room temperature (approximately 20° C. to 25° C.), sintered for 15 minutes at 850° C., and then cooled down in the air. The coated alumina particles were further treated with 3-aminopropyltriethoxysilane and dried to form abrasive particles representative of embodiments herein. Abrasive particles and untreated alumina particles were mixed with phenolic resin, respectively, pressed, and cured to form bar samples. Bar samples including representative abrasive particles are referred to as Sample S5, and bar samples including untreated alumina particles are referred to as Sample CS4. Flexural strength (i.e., MoR) were tested on all the bar samples.

As illustrated in FIG. 4, Sample S5 demonstrated significantly improved MoR over Sample CS4.

Example 3

Particle samples CS1, CS2, and S3 from Example 1 were further treated as described in the following paragraphs. Coating with silane was performed in the same manner as described in Example 2 and 3-aminopropyltriethoxysilane was used. Bar Samples were formed in the same manner as described in Example 2.

CS1 particles were coated with silane and used to form bar Sample CS7.

Particles of Sample CS2 and S3 were mixed with water using a Kenwood mixer at high speed for an hour, respectively. Water-treated CS2 particles were divided into 2 portions. One portion was coated with silane and then used to form bar Sample CS10, and another portion was not coated with silane and directly used to form bar Sample CS9. Untreated CS2 particles were coated with silane and used to form bar Sample CS8.

Untreated S3 particles were coated with silane and used to form bar Sample S11. A portion of water-treated S3 particles were coated with silane and formed into bar Sample S13, and another portion of water-treated S3 particles were not coated with silane and directly used to form bar Sample S12.

Figure 5:
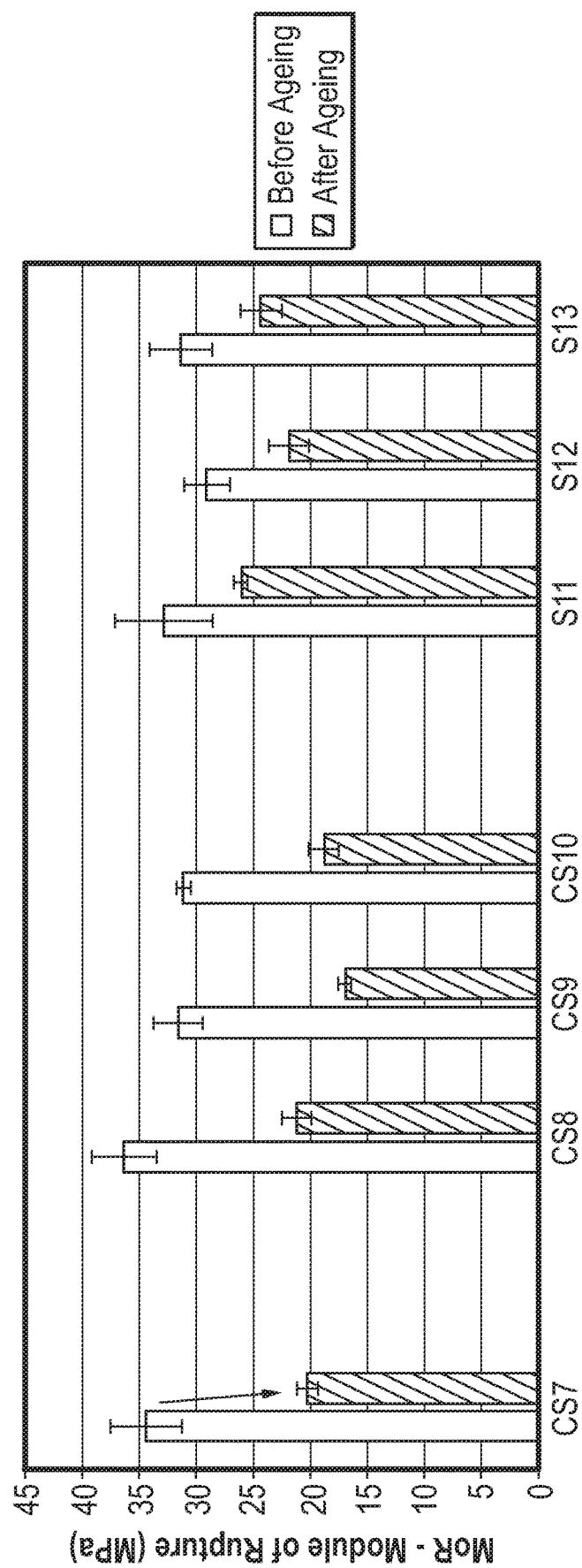
FIG. 5 includes a plot illustrating MoR between abrasive samples.

At least 3 bars from each Sample were aged at 50° C. and 90% relative humidity and then tested for MoR. At least 3 unaged bars from each Sample were also tested for MoR. FIG. 5 includes an illustration of MoR of all the Samples.

As illustrated, aged Sample CS7 demonstrated a drop in MoR of 41% compared to unaged Sample CS7. Aged Sample CS8 demonstrated a reduction in MoR of about 42% compared to unaged CS8. Aged Sample CS9 demonstrated a reduction in MoR of about 46% compared to unaged Sample CS9. Aged Sample CS10 demonstrated a reduction in MoR of about 40% compared to unaged Sample CS10.

Aged Sample S11 demonstrated a reduction in MoR of about 21% compared to unaged Sample S11. Aged Sample S12 demonstrated a reduction in MoR of about 25% compared to unaged Sample S12. Aged Sample S13 demonstrated a reduction in MoR of about 22% compared to unaged Sample S13.

Example 4

Hipal® alumina particles were treated with 3-aminopropyltriethoxysilane and then dried at 150° C. Amino silane coated particles were used to form bar Sample CS14. All bar Samples were formed in the same manner as described in Example 2.

Additional Hipal® alumina particles were wetted using a Ludox® colloidal silica suspension in the same manner as described in Example 1. A portion of wetted particles were sintered at 960° C. and used to form Sample CS15. A second portion of wetted particles were sintered at 960° C. and then coated with 3-aminopropyltriethoxysilane and dried at 150° C. to form abrasive particles representative of embodiments herein. Bar Sample S16 were formed using the representative abrasive particles.

A third portion of wetted particles were dried at 150° C. and used to form bar Sample CS17. A fourth portion of wetted particles were dried at 150° C., coated with 3-aminopropyltriethoxysilane, dried again at 150° C., and then used to form bar Sample CS18. A fifth portion of wetted particles were dried at 150° C., coated with 3-aminopropyltriethoxysilane, dried at room temperature (20 to 25° C.), and then used to form bar Sample CS19.

Figure 6:
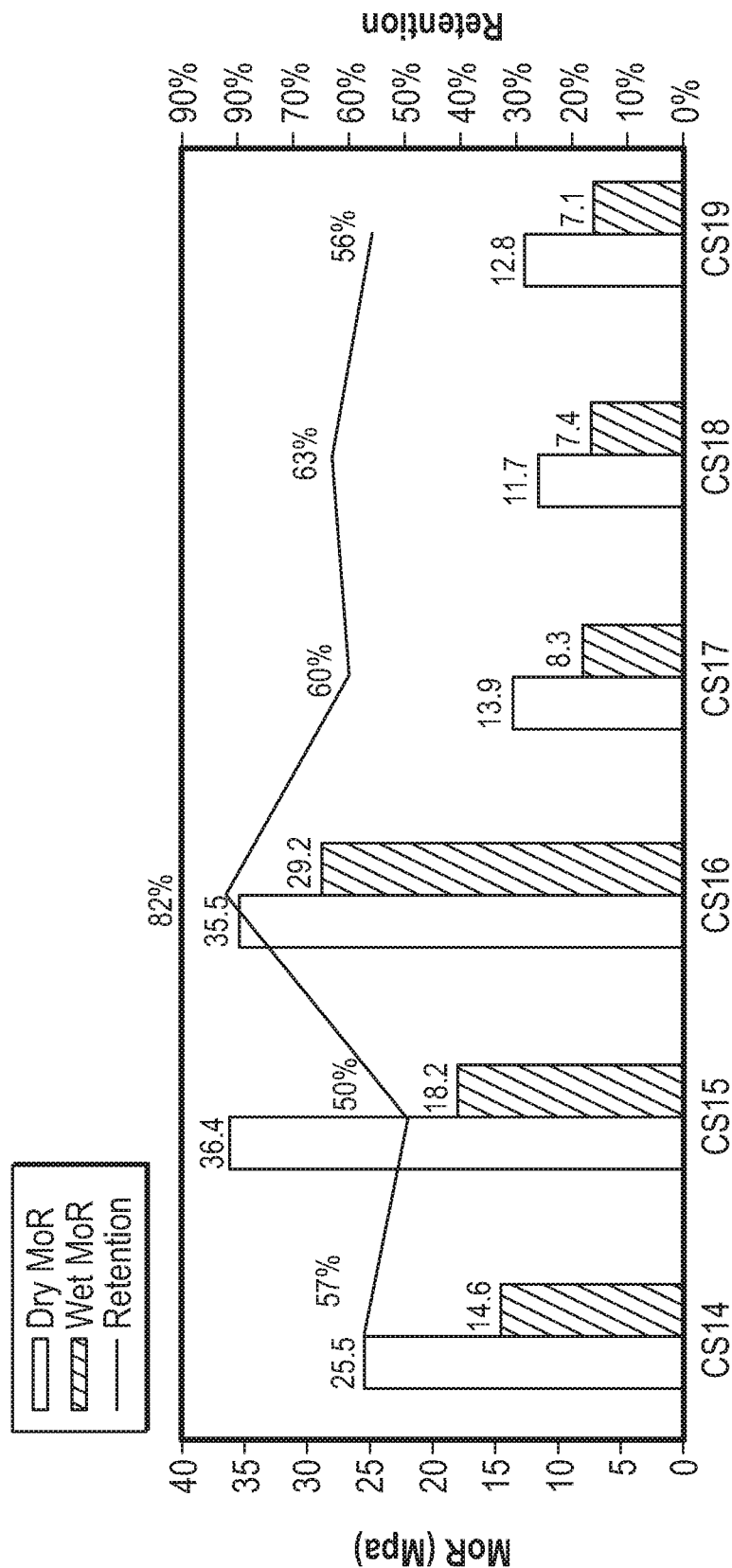
FIG. 6 includes a plot illustrating of dry and wet MoR and MoR retention of abrasive samples.

Bars from each Sample were tested for both wet MoR and dry MoR. Wet MoR refers to MoR tested on bars that had been boiled in water for 150 minutes. FIG. 6 includes an illustration of wet and dry MoR and retention of MoR after boiling for all Samples. Sample S16 demonstrated highest wet MoR (29.2 MPa) and MoR retention (82%) after boiling compared to respective wet MoR and MoR retention of Samples CS14 (14.6 MPa; 57%), CS15 (18.2 MPa; 50%), CS17 (8.3 MPa; 60%), CS18 (7.4 MPa; 63%), and CS19 (7.1 MPa; 56%).

Example 5

Figure 7A:
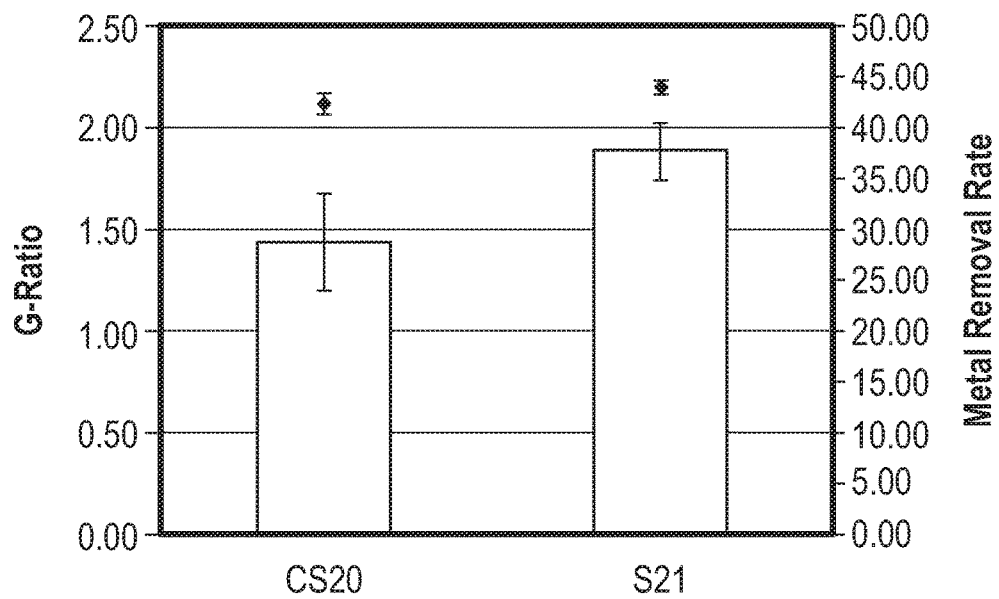
FIGS. 7A and 7B include plots illustrating G-Ratio and Material Removal Rate (MRR) of abrasive samples.
Figure 7B:
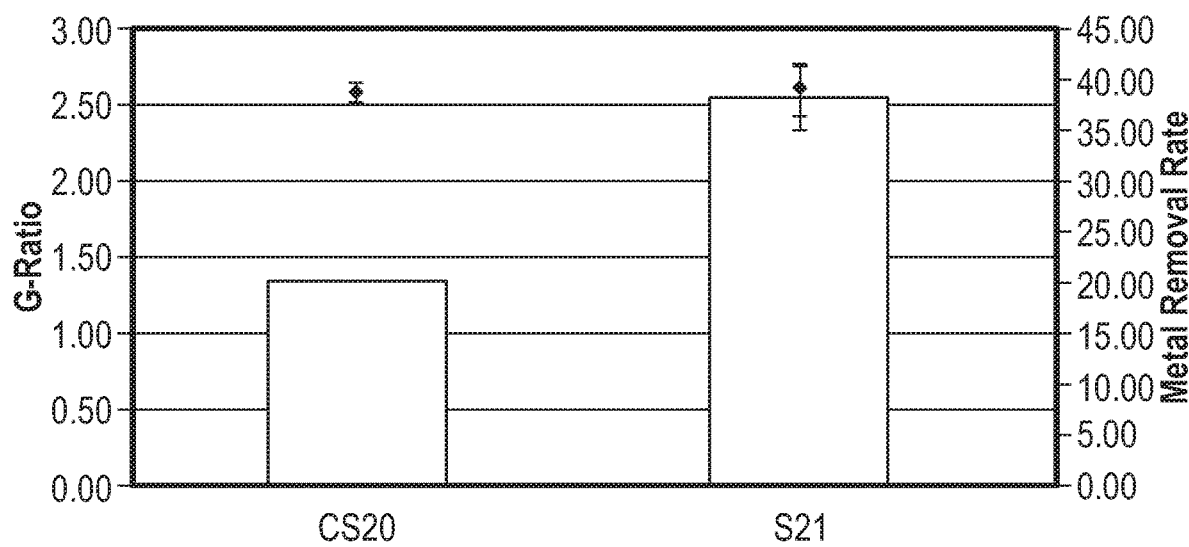

Grinding wheels Sample CS20 were formed using Hipal® alumina particles. Additional Hipal® alumina particles were treated with colloidal silica and then silane in the same manner as disclosed in Example 2 to form representative abrasive particles, which were used to form grinding wheels Sample S21. At least 3 wheels from each Wheel Sample were tested on grinding a workpiece of stainless steel and a workpiece of carbon steel, respectively. FIG. 7A includes a plot of G-Ratio vs. Material Removal Rate of Samples tested on stainless steel. FIG. 7B includes a plot of G-Ratio vs. Material Removal Rate of Samples tested on carbon steel.

As illustrated, Wheel Sample S21, compared to Sample CS20, demonstrated improved G-Ratio and Material Removal Rate on both types of workpieces.

Example 6

HiPal® alumina particles of 36 grits were mixed with Ludox® colloidal silica at a silica content of 0.1 wt. % for a total weight of the alumina particles for 3 to 5 minutes. Portions of the wetted particles were sintered at 850° C., 960° C., and 1100° C. for 15 minutes to form coated particle Sample S23, S24, S25, respectively. Another portion of the wetted particles were dried at 250° C. to form Sample CS22 Roughness and domain sizes of all the samples were analyzed according to embodiments herein and included in Table 3 below. Crystallinity of all the samples were analyzed according to embodiments herein, except powder sample of Sample CS22 was prepared at the heating temperature of 250° C. AFM phase images of the samples are included in FIGS. 12A to 12D.

TABLE 3

|  | CS22 | S23 | S24 | S25 |
|---|---|---|---|---|
| Average Rq (nm) | 6 | 3 | 3 | 3 |
| Average Domain size. | 19 | 28 | 56 | 126 |
| Crystallinity | 0% | 3% | 63% | 61% |

Figures 13A, 13B:
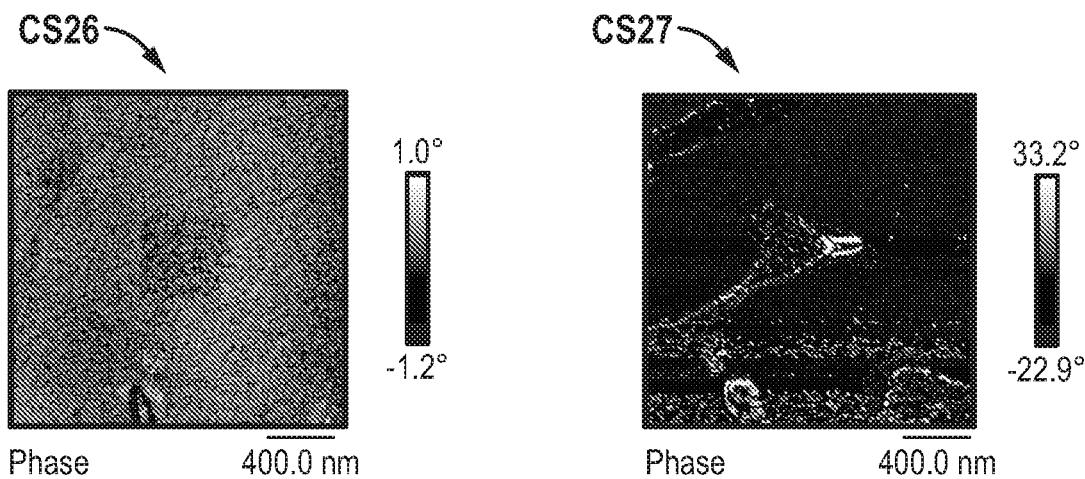
FIGS. 13A and 13B include images of abrasive particles.

Flat pure crystalline alumina substrates ($Al_2O_3$ content>99.5%) were coated with sodium silicate using a solution including silica at the concentration of 26% and $Na_2O$ 8%. The sodium silicate includes 76 wt % of silica and 24 wt % of sodium oxide. Coated substrates were heated at 850° C. and 1100° C. to form sintered sodium silicate coating Sample CS26 and CS27, respectively. Average roughness of the sintered sodium silicate coating was measured in the same manner as described in embodiments herein with respect to the first portion. Average roughness of the sintered coating on the flat pure crystalline alumina substrate prepared as disclosed herein is similar to the roughness of the sintered coating on abrasive particle cores. Crystallinity of powder sodium silicate sintered at 850° C. and 1100° C. was determined in according to embodiments herein. AFM phase images of Sample CS26 and CS27 are included in FIGS. 13A and 13B, respectively.

TABLE 4

|  | CS26 | CS27 |
|---|---|---|
| Average Rq (nm) | 0.5 | 1 |
| Crystallinity | >0% | 0% |

Example 7

Figure 14:
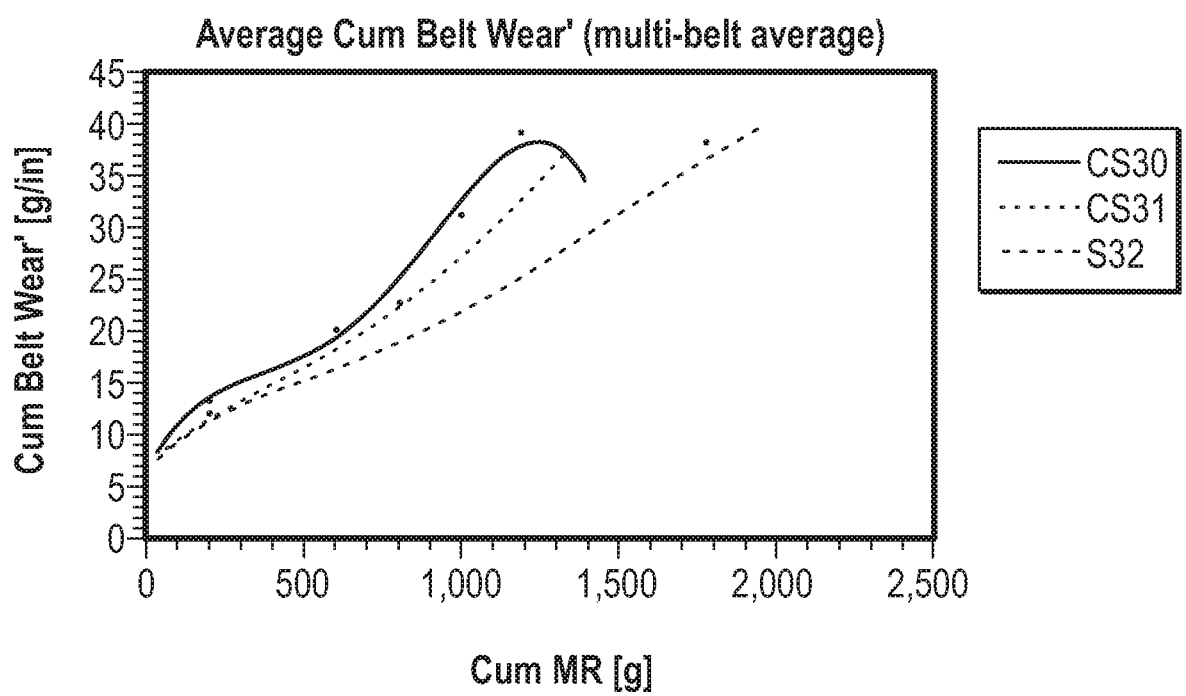
FIG. 14 includes a graph of cumulative wear rates vs. cumulative material removal of abrasive samples.

HiPal® alumina particles of 24 grits were mixed with Ludox® colloidal silica at a silica content of 0.1 wt. % for a total weight of the alumina particles for 3 to 5 minutes. Portions of the wetted particles were sintered at 850° C. and 960° C. for 15 minutes to form coated particles, which were then used to form belt Samples S32 and S33, respectively. Another portion of the wetted particles were dried at 250° C. and used to form belt Sample CS31. Belt samples formed with untreated particles are referred to as Sample CS30. Samples CS30, CS31, and S32 were tested on grinding rubber. FIG. 14 includes a plot of average cumulative wear rates vs. average cumulative material removal of the belt samples. Each data point illustrated in FIG. 14 is an average of at least 3 belt samples. As illustrated, Samples S32 demonstrated improved cumulative wear rates compared to Samples CS30 and CS31 for the same amount of the removed material.

Example 8

HiPal® alumina particles are mixed with Ludox® colloidal silica at a silica content of 0.1 wt. % for a total weight of the alumina particles for 3 to 5 minutes. Portions of the wetted particles are dried at 500° C. or sintered at 850° C. or 1200° C. Abrasive samples are formed using the coated abrasive particles, and material removal tests are conducted on the abrasive samples. Samples formed with abrasive particles coated at 850° C. are expected to have improved performance over abrasive samples formed with abrasive particles coated at 500° C. and 1200° C.

The foregoing embodiments represent a departure from the state-of-the-art. Embodiments are directed to abrasive particles including a coating overlying at least a portion of a core, and the coating can include a first portion including a sintered ceramic material, such as sintered colloidal silica, and a second portion including a silane or a silane reaction product overlying the core and the first portion. Particularly, the first portion can have a particular average roughness and crystallinity. Not wishing to be bound to any theory, the average roughness and/or crystallinity in combination with other characteristics of the coating as noted in embodiments herein can help improve performance of abrasive particles, Abrasive articles formed with representative abrasive particles demonstrate improved performance and properties, such as wet MoR, G-Ratio, and MMR over abrasive articles including abrasive particles including a dried coating. Not wishing to be bound to any theory, improved properties and performance of abrasive articles may be facilitated by one or more factors including the composition, microstructure, thickness, content of silica, content of silicon of the coating of abrasive particles of embodiments herein, which may help form an improved interface and improved bonding between the bond material and abrasive particles.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:
1. An abrasive particle, comprising:
a core including a ceramic material;
a coating overlying the core, wherein the coating comprises:
  a first portion overlying at least a portion of the core, wherein the first portion comprises sintered colloidal silica and a surface roughness of not greater than 5 nm and a crystallinity of not greater than 60%; and
  a second portion overlying at least a portion of the core, wherein the second portion comprises silane or silane reaction product.
2. An abrasive particle, comprising:
a core including a ceramic material including an average crystallite size of less than 1 micron;
a coating overlying the core, wherein the coating comprises:
  a first portion overlying at least a portion of the core, wherein the first portion comprises a sintered ceramic material and a surface roughness of not greater than 5 nm and a crystallinity of not greater than 60%; and
  a second portion overlying at least a portion of the core, wherein the second portion comprises silane or silane reaction product.
3. A plurality of abrasive particles, comprising a plurality of the abrasive particles of claim 1.
4. The plurality of abrasive particles of claim 3, wherein:
the core comprises a ceramic material including a first element forming a cation of the ceramic material; and
the plurality of abrasive particles comprise:
  an average Silicon/Cation Energy Dispersive Spectroscopy Percentage of at least 0.87%;
  an average Silicon Energy Dispersive Spectroscopy value of at least 0.39; or
  a combination thereof.
5. The plurality of abrasive particles of claim 3, wherein the core comprises polycrystalline alpha-alumina comprising an average crystallite size of less than 1 micron.
6. The plurality of abrasive particles of claim 4, wherein the average Silicon Energy Dispersive Spectroscopy value is not greater than 6.00.
7. The plurality of abrasive particles of claim 4, wherein the average Silicon/Cation Energy Dispersive Spectroscopy Percentage is not greater than 10.0%.
8. The plurality of abrasive particles of claim 7, wherein the first element forming a cation of the ceramic material comprises aluminum, zirconium, magnesium, or a combination thereof.
9. The plurality of abrasive particles of claim 3, wherein the abrasive particle comprises a content of the coating of at least 0.01 wt. % and not greater than 1 wt. % for a total weight of the core.
10. The plurality of abrasive particles of claim 3, wherein the coating comprises a thickness of at least 0.05 microns and not greater than 10 microns.
11. The plurality of abrasive particles of claim 3, wherein the coating comprises a polycrystalline material including silica.
12. The plurality of abrasive particles of claim 3, wherein the coating further comprises an amorphous phase including silica.
13. The plurality of abrasive particles of claim 3, wherein the roughness is at least 3 nm.
14. The plurality of abrasive particles of claim 3, wherein the crystallinity is at least 3%.
15. An abrasive article, comprising a body including a bond material and the plurality of abrasive particles of claim 3 contained in the bond material.
16. A plurality of abrasive particles, comprising a plurality of the abrasive particles of claim 2.
17. The plurality of abrasive particles of claim 16, wherein:
the core comprises a ceramic material including a first element forming a cation of the ceramic material; and
the plurality of abrasive particles comprise:
  an average Silicon/Cation Energy Dispersive Spectroscopy Percentage of at least 0.87%;
  an average Silicon Energy Dispersive Spectroscopy value of at least 0.39; or
  a combination thereof.
18. The plurality of abrasive particles of claim 16, wherein the coating comprises a polycrystalline material including silica.
19. The plurality of abrasive particles of claim 16, wherein the coating further comprises an amorphous phase including silica.

20. The plurality of abrasive particles of claim 16, wherein the crystallinity is at least 3%.

* * * * *